(12) United States Patent  
Newton

(10) Patent No.: US 9,660,913 B2
(45) Date of Patent: May 23, 2017

(54) NETWORK PACKET BROKER

(71) Applicant: Network Critical Solutions Limited, Berkshire (GB)

(72) Inventor: Christopher Andrew Newton, Cambridge (GB)

(73) Assignee: NETWORK CRITICAL SOLUTIONS LIMITED, Berkshire (GB)

(*) Notice: Subject to any disclaimer, the term of this patent is extended or adjusted under 35 U.S.C. 154(b) by 67 days.

(21) Appl. No.: 14/656,204

(22) Filed: Mar. 12, 2015

(65) Prior Publication Data
US 2015/0263889 A1 Sep. 17, 2015

Related U.S. Application Data

(60) Provisional application No. 61/952,965, filed on Mar. 14, 2014.

(51) Int. Cl.
*H04L 12/28* (2006.01)
*H04L 12/801* (2013.01)
*H04L 12/24* (2006.01)
*H04L 12/947* (2013.01)
*H04L 12/26* (2006.01)

(52) U.S. Cl.
CPC .......... *H04L 47/10* (2013.01); *H04L 41/0893* (2013.01); *H04L 43/028* (2013.01); *H04L 49/25* (2013.01)

(58) Field of Classification Search
CPC ..... H04L 47/10; H04L 41/0893; H04L 49/25; H04L 43/028
See application file for complete search history.

(56) References Cited

U.S. PATENT DOCUMENTS 5,568,402 A * 10/1996 Gray .................. G05B 19/4183
709/224
8,098,677 B1 * 1/2012 Pleshek .................. H04L 43/12
370/351

(Continued)

OTHER PUBLICATIONS

"Director XStream", Data Sheet (Pubdirxd Rev. F), NetOptics, Dec. 2013, pp. 1-2, Recovered from the internet (Sep. 85, 2814), http://www.netoptics.com/sites/default/files/pdf/datasheet/8ls-8847-881-PUBDIRXD-F.pdf.

(Continued)

*Primary Examiner* — Robert Wilson
(74) *Attorney, Agent, or Firm* — Cooper Legal Group, LLC

(57) ABSTRACT

A network packet broker comprising a plurality of source ports for receiving incoming data packets, a plurality of destination ports for transmitting outgoing data packets, a switch chip arranged to direct incoming data packets from a source port to a destination port based on a configurable set of rules, and a port for receiving a configuration model from a user interface. The configuration model comprises a set of maps and a set of filters, each map specifying at least one source port and at least one destination port, and each filter specifying a condition under which a packet of interest may pass the filter. A rule generator is provided to convert the configuration model into a set of rules for configuring the switch chip. The rule generator is arranged to convert a plurality of maps into a set of rules which the switch chip can implement in one pass.

52 Claims, 11 Drawing Sheets

(56) References Cited

U.S. PATENT DOCUMENTS

| | | | |
|---|---|---|---|
| 8,934,495 B1* | 1/2015 | Hilton | H04L 67/36 370/401 |
| 2005/0278431 A1* | 12/2005 | Goldschmidt | H04L 41/0869 709/207 |
| 2011/0231016 A1* | 9/2011 | Goulding | G06N 3/008 700/246 |
| 2011/0296015 A1* | 12/2011 | Chakravarty | G06F 11/3065 709/224 |
| 2012/0026288 A1* | 2/2012 | Tourapis | H04N 19/597 348/43 |
| 2012/0106354 A1* | 5/2012 | Pleshek | H04L 43/12 370/241 |
| 2014/0082237 A1* | 3/2014 | Wertheimer | G06F 13/14 710/104 |
| 2015/0139238 A1* | 5/2015 | Pourzandi | H04L 45/42 370/392 |
| 2015/0263889 A1* | 9/2015 | Newton | H04L 41/0893 370/254 |
| 2016/0094418 A1* | 3/2016 | Raney | H04L 43/028 370/241 |

OTHER PUBLICATIONS

"Indigo Pro", Data Sheet (PUBPIP27 Rev. D) NetOptics, Dec. 2013, pp. 1-2, Recovered from the internet (Sep. 85, 2814), http://www.netoptics.com/sites/default/files/pdf/datasheet/net-optics-ixia-81s-881s-881-Indigo-Pro-D.pdf.

Search Report cited in GB Application No. GB1404567.8, dated Sep. 8, 2014, pp. 1-4.

"Drag-n-Vu (TM) Technology", Solution Data Sheet, Network Critical, Nov. 2013, http://www.networkcritical.com/NetworkCritical/media/resource-library/product-datasheets/Drag-n-Vu-Data-Sheet.pdf pp. 1-2.

* cited by examiner

NETWORK PACKET BROKER

RELATED APPLICATIONS

This application claims priority to U.S. Provisional Application 61/952,965, titled "NETWORK PACKET BROKER" and filed on Mar. 14, 2014, which is incorporated herein by reference.

BACKGROUND

The present disclosure relates to a network packet broker, and to a method of configuring a network packet broker.

A network packet broker is a device that allows the selective routing of packets of information. A network packet broker typically comprises a number of physical network ports that can be used to connect other networked devices. The function of a network packet broker is to receive incoming traffic from connected devices and to retransmit that traffic to other connected devices selectively according to the operator's wishes.

Incoming or ingress traffic is usually a copy of traffic observed on a live network. This may be provided, for example, by a network tap or a Switched Port Analyzer (SPAN) port of a network switch. Outgoing or egress traffic is usually sent to specialist tools on a separate monitoring network for security, performance monitoring and other functions.

In addition to the regular network ports, at least one port on a network packet broker may be designated a management port. Management ports are used for communication with user interfaces to allow operators to configure the system. Management ports may be connected to a management network, which may be the same as the live or monitoring network, or a separate network that is used exclusively for system administration purposes.

The key benefit of a network packet broker is that, once relevant devices have been physically connected to the network ports, ingress traffic can then be directed to different destination ports by appropriate configuration of the network packet broker, without the need for an operator to physically adjust the connected equipment or cabling. Thus any authorised user on the management network may on demand capture traffic, or selected parts of it, from any available location on the live network and send that traffic to any connected tool on the monitoring network.

Known network packet brokers are typically built around a set of physical network ports, a general purpose CPU, and a network switch chip. A network switch chip is a specialist component that connects to a set of incoming and outgoing network ports and is capable of making decisions about how to direct incoming network traffic, based on a configurable list of rules. The CPU runs general management software for the device, including communicating with user interfaces and configuring the rules on the switch chip.

Each incoming packet of traffic is first broken down by the switch chip, which has some embedded knowledge of network protocols. Certain identified data is extracted from the packet if it is present. Typically, headers are picked out from various network protocols if they are in use. This data is combined to form a single binary string called a key. Packets of interest for the user's traffic management purposes can then be identified by comparing some or all of the bits in each incoming packet's key against a second binary string that has a specific value representing the traffic of interest, and selecting packets where all of the required bits match. The bits to be compared are identified by a third binary string known as the mask, which has a 1 in each position to be compared and a 0 in positions to be ignored. The value string and mask string are referred to in combination as a value/mask pair.

The switch chip may be configured with a number of rules in a rule list. Each rule in the rule list typically comprises one or more source ports, a value/mask pair, and a (possibly empty) set of destination ports. The switch chip is typically arranged to apply the rules in its rule list according to the order in which they occur in the list. Thus, when a packet arrives at the switch chip, the switch chip will look for the first applicable rule. A packet arriving at a source port specified by that rule and passing its value/mask pair will be forwarded to all ports in its set of destination ports.

Conventional user interfaces for network packet brokers tend to expose the switch functionality and rule list fairly directly to the user. As a consequence conventional network packet brokers suffer from weak expressive power, manual and error-prone interactions, and potential inefficiencies in terms of the number of rules in the rule list.

SUMMARY

According to one aspect of the present disclosure there is provided a network packet broker comprising:
  a plurality of source ports for receiving incoming data packets;
  a plurality of destination ports for transmitting outgoing data packets;
  a switch chip arranged to direct incoming data packets from a source port to a destination port based on a configurable set of rules;
  a port for receiving a configuration model from a user interface, the configuration model comprising a set of maps and a set of filters,
  each map specifying at least one source port and at least one destination port, and
  each filter specifying a condition under which a packet of interest may pass the filter; and
  a rule generator arranged to convert the configuration model into a set of rules for configuring the switch chip,
  wherein the rule generator is arranged to convert a plurality of maps into a set of rules which the switch chip can implement in one pass.

The present disclosure may provide the advantage that, by receiving a configuration model comprising a set of maps and a set of filters, and providing a rule generator arranged to convert a plurality of maps into a set of rules which the switch chip can implement in one pass, a network packet broker which is more efficient, less error prone, and with greater expressive power may be achieved.

A "map" in the configuration model is preferably a user-defined connection between one or more source ports and one or more destination ports. A "filter" is preferably a self-contained, reusable entity that might apply to any number of maps. Thus, a filter may be defined without reference to a port. This may provide the configuration model with greater expressive power.

As used herein, the phrase "in one pass" preferably means that the switch chip is able to forward packets from the input ports to the output ports directly without requiring multiple filter engines. This is preferably achieved using a single set of rules with which the switch chip is configured. Preferably, any conflicts between maps such as overlapping forwarding or filtering requirements are resolved in advance before the switch chip is programmed.

Preferably the configuration model is received on a management port, although any suitable port could be used for this purpose.

A filter may specify an acceptance value for a field within a packet. Thus a packet may pass the filter if the actual value in the packet is among the values the filter accepts.

The rule generator may be arranged to convert the filter acceptance values into value/mask pairs. This may be done, for example, by a filter conversion module, or some other part of the rule generator.

A map may specify a filter. A map may specify that a packet arriving at any of its source ports and passing its specified filters should be forwarded to each of its destination ports.

In a preferred embodiment a map may specify a filter as either a required filter or an exclusion filter. In the case of an exclusion filter, the required behaviour may be that packets are not forwarded by the map if any of those filters applies. In general, such conditions cannot be implemented directly by a rule in the switch chip. Thus, where exclusion filters are used, the rule generator may be arranged to convert a map specifying an exclusion filter into maps which perform the equivalent function using only required filters. This may be done, for example, by inserting a new map into the set of maps, the new map selecting packets satisfying the undesired condition and specifying an empty set of destination ports. Thus, while user-defined maps may have both source and destination ports, as an implementation technique further maps may be internally generated that specify an empty set of destination ports. By carefully inserting the new maps into a rule list in the appropriate order, the required behaviour may be obtained.

In a preferred embodiment a map is able to specify a plurality of filters. Preferably the plurality of filters may include required filters and excluded filters. This may provide significant advantages in terms of the ease with which the user may configure the network packet broker.

Preferably each filter is identified by a unique ID, and maps specify their filters using those filter IDs. The filter ID may be, for example, an abstract identifier either provided by the user or generated internally by the rule generator. This can allow the rule generator to operate on the maps without having to know the actual definition of each filter, which may provide significant advantages in terms of speed and/or complexity of the rule generator.

Each map in the configuration model is preferably defined independently of the other maps. For example, if any map is defined that would forward an incoming packet from a given source port to a given destination port, then the packet may be forwarded even if there are other maps between those ports that would not forward that packet because of their filters. However, a packet arriving at a source port may be forwarded to a particular destination port only once if multiple maps exist that would each do so.

Preferably the rule generator is arranged to convert a set of maps and a set of filters in an arbitrary order into an ordered list of rules for configuring the switch chip, which the switch chip can implement in one pass.

In some cases the configuration model will include overlapping maps, that is, maps with overlapping forwarding and/or filtering requirements. Preferably two maps are said to overlap if it is possible for a packet to be forwarded by both maps, taking into account any filters specified by the maps. Thus the rule generator may be arranged to receive a configuration model comprising a plurality of overlapping maps, and to convert the plurality of overlapping maps into a set of rules which the switch chip can implement in one pass.

In order to convert the configuration model into a set of rules for configuring the switch chip, the rule generator may comprise a rule list forming module arranged to produce an intermediate list of rules from the configuration model. This can allow an algorithm to be used which operates on the intermediate list of rules to arrive at the final set of rules for configuring the switch chip.

The rules in the intermediate list of rules may have a similar structure to maps but with no exclusion filters. Thus a rule in the intermediate list of rules may comprise at least one source port, a (possibly empty) list of destination ports, and any required filters. However in other embodiments, the rules in the intermediate list of rules may have a different structure. For example, the rules may be in a bitwise form, such as in the form of value/mask pairs, or they may be in the same form as the maps in the configuration model, or they may be in any form which is intermediate to the maps in the configuration model and the rules which configure the switch chip.

In a preferred embodiment, the rule list forming module produces the intermediate rule list referring to filters only by a filter ID. The filters may then later be converted from their user-defined form to a specific value/mask-based representation. This strategy can offer a significant speed advantage compared to the approach of working with filters defined in terms of value/mask pairs throughout.

Thus the intermediate list of rules produced by the rule list forming module may identify any filters required by rules using filter IDs. In this way, the rule list forming module does not need to be aware of the full definition of each filter, which may improve the speed of operation.

The rule generator may further comprise a filter conversion module arranged to convert each filter from a user-provided specification of packets of interest into an internal form where values accepted for each filter field are represented using value/mask pairs.

In some embodiments, the rule list forming module may consider all or part of the full definitions of filters for optimisation purposes, but in this case the intermediate rule list may still indicate filters only by filter ID.

In some embodiments the rule generator may be arranged to convert an intermediate rule list that specifies required filters by ID to another intermediate rule list that specifies required filters using a value/mask pair for each filter field.

Preferably the rule list forming module is arranged to incrementally modify the intermediate list of rules to add the effect of successive maps from the configuration model.

Preferably the intermediate list of rules is modified such that more specific rules (i.e. rules with more specific filters for the same source ports) occur earlier in the list than less specific rules.

The intermediate list of rules may be modified to add the effect of a map such that any packet which would be forwarded to a destination port by the intermediate list of rules before it was modified is still done so by the intermediate list of rules after it is modified.

The intermediate list of rules may be modified to add the effect of a map such that any packet arriving at a source port and matching a filter specified by the map will be directed to all destination ports specified by the map.

In order to handle exclusion filters, the rule generator may comprise an exclusion filter conversion module arranged to convert a map specifying an exclusion filter into maps which perform the equivalent function using required filters, and the rule list forming module may be arranged to insert the maps generated by the exclusion filter conversion module into the rule list such that rules to drop packets that are unwanted due to the exclusion filter preempt later rules that would otherwise pass those packets. This is preferably done without interfering with the processing of any other traffic.

Preferably the rule list forming module is arranged to compare each map with successive rules in the intermediate list of rules. The rule list forming module may be arranged to add a new rule or modify an existing rule in the intermediate list of rules in dependence on the result of the comparison.

Preferably, if a map and a rule match the same traffic (which preferably means that the map and the rule have the same source ports and required filters, and the map has no exclusion filters), then a set of destination ports in the rule is extended to include the destination ports of the map.

Preferably, if a map matches all of the same traffic as a rule but not vice versa (which preferably means that the map has all of the source ports of the rule, the rule has all of the required filters of the map, the map has no exclusion filters, but the map and the rule do not match the same traffic), then a set of destination ports in the rule is extended to include the destination ports of the map.

Preferably, if a rule passes all of the same traffic as the map but not vice versa (which preferably means that the rule has all of the source ports of the map, the map requires all of the filters of the rule, but the map and the rule do not match the same traffic), then a new rule is inserted in the intermediate list of rules with the source ports and the required filters of the map, and the destination ports of the map and the rule.

Preferably, if there is a potential overlap between a map and a rule, then a new rule is inserted in the intermediate list of rules, the new rule sending the possibly overlapping traffic to both sets of destination ports. A potential overlap may arise, for example, if a map and a rule share any common source port, and one does not require a filter which is excluded by the other.

Alternatively, rather than assuming that there is a potential overlap if a map and a rule share any common source port, and one does not require a filter which is excluded by the other, it would be possible for the rule list forming module to inspect the filter definitions and make a more informed decision about whether there is potential overlap. This may avoid the rule list forming module adding overlap rules that will predictably become redundant later.

In some cases the rule list forming module may operate on a rule list where the rules specify filters in some form other than value/mask pairs. For example, the rules in the intermediate list of rules may refer to named filters, as defined by the user. Thus the rule generator may comprise a rule conversion module arranged to convert rules in the intermediate list of rules with value/mask pairs.

The rule generator may comprise a redundancy reduction module arranged to remove redundancy from an intermediate list of rules. This may allow the generation of a shorter list of rules to describe the same behaviour, and thus support a greater number of maps and filters for a switch chip with a given rule capacity. The redundancy reduction may take place once the complete rule list has been generated, and/or during the process of generating the rule list, and/or at any other stage.

The redundancy reduction module may be arranged to remove a rule from the intermediate list of rules if any earlier rules in the list collectively handle all packets that would be processed by that rule. Alternatively or in addition the redundancy reduction module may be arranged to remove a rule from the intermediate list of rules if at least one later rule makes an earlier rule redundant. This may be the case if the later rule dominates the first rule (i.e. defines destination ports for all of the traffic of the first rule) and makes the same decision about destination ports, as long as no rule exists in between that also selects any of the same traffic but makes a different decision about destination ports.

The rule generator may comprise a rule projection module arranged to convert each rule in the intermediate list of rules into a format required to program the switch chip.

For example, when the intermediate list of rules has been modified to include the effect of all of the maps in the configuration model, the intermediate list of rules (if necessary, after conversion into bitwise form) may be converted into a format required to program the switch chip, and then used to program the switch chip.

Preferably the set of rules for programming the switch chip is stored in memory. The memory may be content addressable memory such as ternary content addressable memory (TCAM) or any other type of memory such as RAM.

The switch chip may be arranged to apply the rules based on the order in which they are stored in the memory.

A rule in the configurable set of rules may comprise: at least one source port; a value string; and a list of destination ports (which may be empty). A rule may further comprise a mask string indicating bits of interest in the value string.

The switch chip may be arranged to compare the value string to a value obtained from a data packet arriving from the source port, and to direct the data packet to destination ports in the list of destination ports in dependence on the result of the comparison.

The switch chip may be arranged to generate a key from an incoming data packet, and to compare the key to the value string. For example, the switch chip may extract certain identified data, typically from packet headers.

The network packet broker may have a number of physical ports, and a physical port may act as a source port or a destination port or both either simultaneously or at different times, and/or as a management port.

The network packet broker may comprise a processing unit programmed to implement the rule generator. In one embodiment, the processing unit may be provided in the same device as the switch chip. In another embodiment, the processing unit may be provided in a separate device from the switch chip, such as a separate controller device. This may be a dedicated device, or a general purpose computer programmed with the appropriate software.

The network packet broker may comprise a plurality of switch chips, and the rule generator may be arranged to convert the configuration model into a set of rules for configuring each of the plurality of switch chips. In this case the network packet broker may be arranged to transfer traffic between the switch chips.

In one embodiment, the rule generator is provided separately. Thus, according to another aspect of the disclosure, there is provided a rule generator arranged to generate a set of rules for configuring a network packet broker, the network packet broker comprising a plurality of source ports for receiving incoming data packets, a plurality of destination ports for transmitting outgoing data packets, and a switch chip for directing incoming data packets from a source port to a destination port based on a configurable set of rules, wherein the rule generator is arranged:

to receive a configuration model comprising a set of maps and a set of filters, each map specifying at least one source port and at least one destination port, and each filter specifying a condition under which a packet of interest may pass the filter; and to convert the configuration model into a set of rules for configuring the switch chip;

wherein the rule generator is arranged to convert a plurality of maps into a set of rules which the switch chip can implement in one pass.

According to another aspect of the disclosure there is provided a network packet broker comprising:

a plurality of ports for receiving incoming data packets and transmitting outgoing data packets;

a switch chip for directing incoming data packets from a source port to a destination port based on a configurable set of rules;

means for receiving a configuration model from a user interface, the configuration model comprising a set of maps and a set of filters, each map specifying at least one source port and at least one destination port, and each filter specifying a condition under which a packet of interest may pass the filter; and a rule generator for converting the configuration model into a set of rules for configuring the switch chip;

wherein the rule generator is arranged to convert a plurality of maps into a set of rules which the switch chip can implement in one pass.

A user interface may be provided in combination with the rule generator and/or network packet broker. Thus, according to another aspect of the disclosure there is provided a network packet broker system comprising a user interface and a network packet broker, wherein:

the user interface is operable to define a configuration model, the configuration model comprising a set of maps and a set of filters, each map specifying at least one source port and at least one destination port, and each filter specifying a condition under which a packet of interest may pass the filter; and the network packet broker comprises:

a plurality of source ports for receiving incoming data packets;

a plurality of destination ports for transmitting outgoing data packets;

a switch chip arranged to direct incoming data packets from a source port to a destination port based on a configurable set of rules; and a rule generator arranged to convert the configuration model into a set of rules for configuring the switch chip;

wherein the rule generator is arranged to convert a plurality of maps into a set of rules which the switch chip can implement in one pass.

The user interface may allow a user to specify a filter to be used with a map.

According to another aspect of the disclosure there is provided a method of configuring a network packet broker, the network packet broker comprising a plurality of source ports for receiving incoming data packets, a plurality of destination ports for transmitting outgoing data packets, and a switch chip for directing incoming data packets from a source port to a destination port based on a configurable set of rules, the method comprising:

defining a configuration model comprising a set of maps and a set of filters, each map specifying at least one source port and at least one destination port, and each filter specifying a condition under which a packet of interest may pass the filter; and converting the configuration model into a set of rules for configuring the switch chip, wherein a plurality of maps is converted into a set of rules which the switch chip can implement in one pass.

The present disclosure may be implemented using software modules programmed into a suitable processor, such as a general purpose CPU (central processing unit), or a dedicated processor.

According to another aspect of the disclosure there is provided a computer program, or a computer readable storage medium comprising program code, which, when executed on a processor, causes the processor to implement a rule generator in any of the forms described above, or to carry out a method as described above.

Features of one aspect of the disclosure may be applied to any other aspect. Apparatus features may be applied to method aspects and vice versa.

BRIEF DESCRIPTION OF THE DRAWINGS

Preferred features of the present disclosure will now be described, purely by way of example, with reference to the accompanying drawings, in which.

DETAILED DESCRIPTION

Network Packet Brokers

Figure 1:
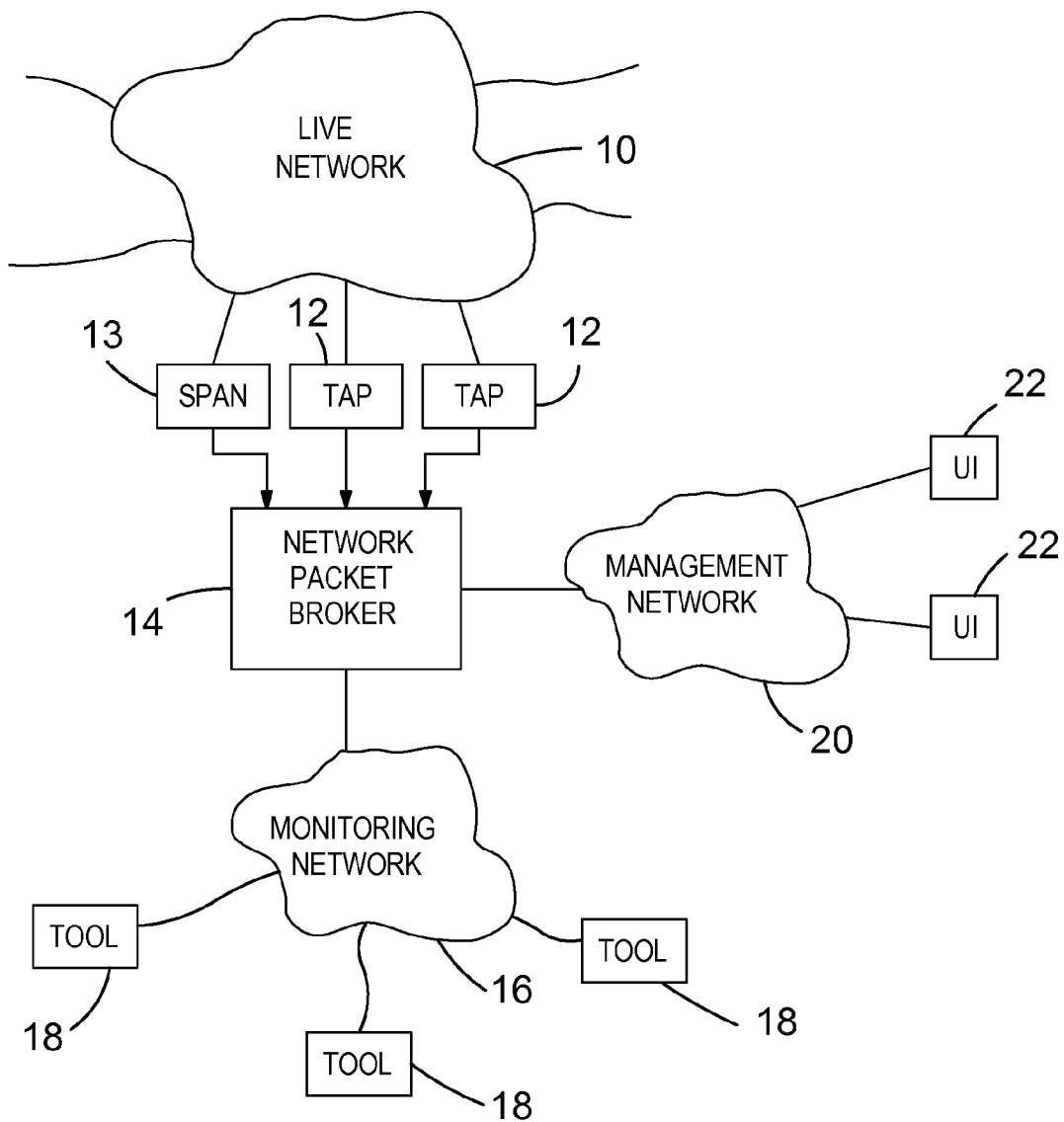
FIG. 1 shows a typical configuration of a system with a network packet broker.

Network packet brokers (also referred to as network monitoring switches, network visibility controllers, and various other names) provide a number of physical network ports that can be used to connect other networked devices using standard cables. The function of a network packet broker is to receive incoming packets from connected devices and selectively retransmit those packets to other connected devices according to the operator's wishes.

Incoming and outgoing packets are generally referred to as ingress and egress traffic, respectively. The port where an ingress packet arrives is referred to as its source port, and a port from which it should be retransmitted is referred to as a destination port.

Ingress traffic is usually a copy of traffic observed on a live network. This may be provided by a network TAP or a Switched Port Analyzer (SPAN) port of a network switch, or in any other way. Outgoing or egress traffic is usually sent to specialist tools on a separate monitoring network for security, performance monitoring and other functions. However, other configurations may also be used.

As well as providing simple one-to-one connections, network packet brokers may also support more powerful configurations such as:

1. Aggregating traffic from each of multiple source ports to the same destination port (for example, sending a tool a cleanly merged stream of traffic from multiple TAP locations on the live network);
2. Replicating traffic from a source port and sending an identical copy to each of multiple destination ports (for example, sending copies of traffic from a TAP on the live network to multiple tools, so each tool can process the traffic for its own purposes without interfering with any other tools);
3. Filtering so that only traffic meeting certain criteria is retransmitted (for example, sending a tool only specific types of traffic, without forwarding other types of traffic that are not useful to that tool or that might interfere with its operation); and
4. Variations on these themes, such as load balancing (for example, dividing an incoming stream of traffic between multiple tools if no single tool has sufficient capacity to process all the data alone).

In an alternative configuration, tools could be placed "in-line", in which case some of the network packet broker's ports are used to collect incoming traffic from the live network and forward it to tools, but other ports will receive traffic back from those tools and then send that return traffic on to other parts of the live network.

In addition to the regular network ports, at least one distinguished port on a network packet broker may be designated a management port. Management ports are used for communication with user interfaces to allow operators to configure the system. Management ports may be connected to a management network. The management network may be the same as the live or monitoring network, or it may be a separate network that is used exclusively for system administration purposes. However some devices may not use dedicated management ports, in which case a regular network port might be used to connect a user interface instead.

FIG. 1 shows a typical configuration of a system with a network packet broker. In FIG. 1, live network 10 may be any kind of network that allows computers to exchange data, such as a local area network, an intranet or an extranet. A plurality of network TAPs 12 are provided, each of which takes a copy of traffic observed at a particular point on the network 10, and provides it to network packet broker 14. In this example, a copy of the live traffic is also provided to the network packet broker 14 by a Switched Port Analyzer (SPAN) port 13. The network packet broker 14 selectively retransmits incoming packets of data to monitoring network 16, in accordance with a configurable set of rules. A set of tools 18 is connected to the monitoring network 16 for performing functions such as security and performance monitoring.

In the arrangement of FIG. 1, a separate management network 20 is also connected to the network packet broker 14. User interfaces 22 are connected to the management network 20. Each user interface 22 may be in the form of software running on a general purpose computer, or may be a dedicated user interface device. The user interfaces 22 allow operators to configure the system by, amongst other things, configuring the set of rules which is used by the network packet broker 14 to retransmit incoming packets of data.

A key benefit of network packet brokers is that, once relevant devices have been physically connected to the network ports on the packet broker, ingress traffic can then be directed to different destination ports purely using the user interface to change the configuration, without the operator needing to physically adjust the connected equipment or cabling. Thus any authorised user on the management network may on demand capture traffic, or selected parts of it, from any available locations on their live network and send that traffic to any connected tools on their monitoring network.

Figure 2:
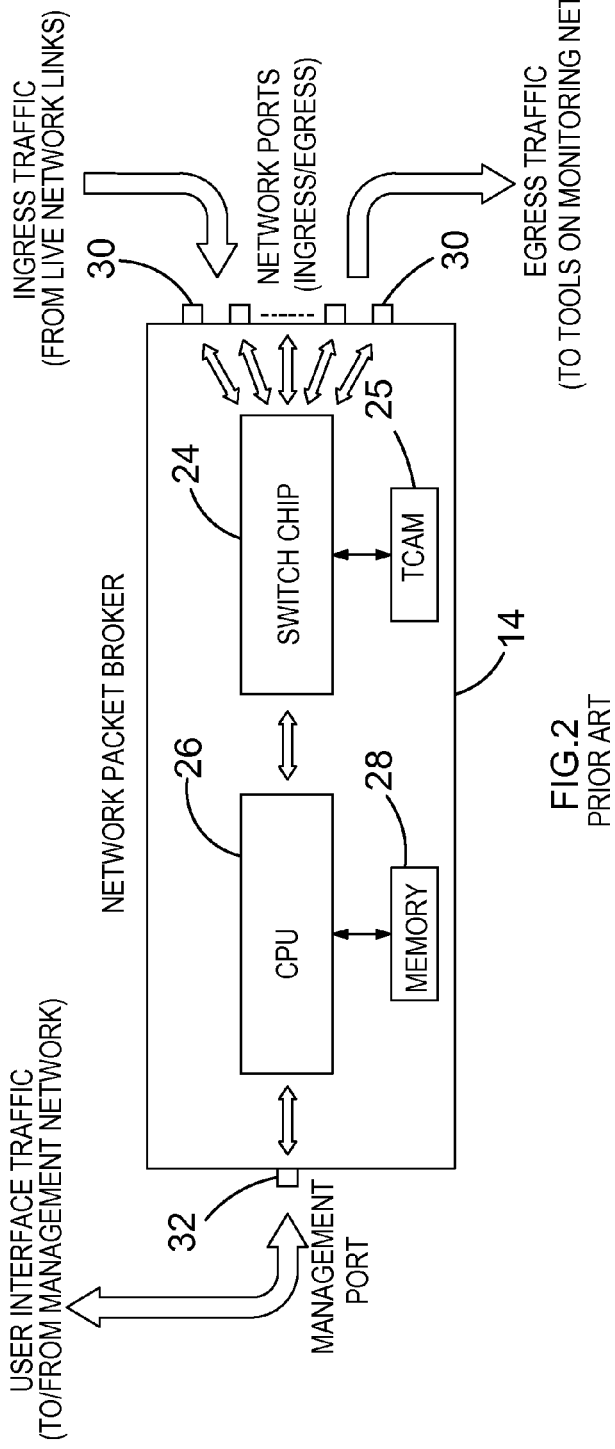
FIG. 2 shows the basic hardware components in a typical network packet broker.

FIG. 2 shows the basic hardware components in a typical network packet broker. Referring to FIG. 2, the network packet broker 14 comprises a switch chip 24 with associated Ternary Content Addressable Memory (TCAM) 25, a central processing unit (CPU) 26 with associated memory 28, a set of physical network ports 30, and a management port 32.

The switch chip 24 is a specialist component that performs the main switching functions. It connects to all incoming and outgoing network ports 30 and is capable of making very fast decisions about how to direct incoming network traffic, based on a configurable list of rules which is stored in TCAM 25. The switch chip 24 also supports more advanced configurations such as those described above, as well as handling practical functions such as buffering to avoid clashes when traffic arrives simultaneously at two source ports contributing to an aggregation.

The CPU 26 runs general management software, which is stored in the memory 28. The functions performed by the CPU include communicating with user interfaces and configuring the rules stored in TCAM 25 either directly or via the switch chip 24.

In the example shown in FIG. 2, a TCAM is used to store the configurable list of rules, which makes the lookup process very efficient. However in other arrangements different types of memory could be used to store the list of rules.

In the example shown in FIG. 2, each of the network ports 30 can act as either an ingress port or an egress port, or both. However in other configurations a given physical network port may be restricted to serving as either an ingress port or an egress port, either permanently or at any given time.

In operation, each incoming packet of traffic is first broken down by the switch chip 24. To achieve this, the switch chip 24 uses some embedded knowledge of network protocols. Certain identified data is extracted from the packet if it is present. Typically headers are picked out from various network protocols if they are in use. This data is combined to form a single binary string called a key.

Figure 3:
FIG. 3 shows an example of a key generated from five commonly used packet headers.

FIG. 3 shows an example of a key generated from five commonly used packet headers (IPv4 source and destination addresses, IP protocol, and layer 4 source and destination ports). Each header is allocated a certain position within the key string. If that header is present in an arriving packet, the key generated by the switch chip for that packet will contain the corresponding data from the header in that position. In some cases, not all packets will include a given header. To allow for this, keys may contain additional fields such as the "Is IPv4" flag shown, which would be set to 1 if IPv4- specific fields contain valid data or to 0 if this was not IPv4 traffic and those fields should be ignored. In some cases, the values of certain header fields might already be sufficient to determine whether other fields in the key will contain meaningful data, in which case no additional validity flag fields would be needed.

Packets of interest for the user's traffic management purposes can be identified by comparing some or all of the bits in each incoming packet's key against a second binary string that has a specific value representing the traffic of interest, and selecting packets where all of the required bits match. The bits to be compared are identified by a third binary string known as a mask, which has a 1 in each position to be compared and a 0 in positions to be ignored. These value and mask strings have the same length as keys.

As an example, in order to look for traffic being sent to a system on the live network with a certain IPv4 address, a mask would be chosen with bits 111 and 71-40 set to 1 and all others set to 0. As a result, the Is IPv4 and IPv4 destination address fields in the key would be considered, but no others. The key would then be compared with a value string that has a 1 in bit 111 and the IPv4 address of interest in bits 71-40. The switch chip would then make a decision about how to deal with that packet based on whether or not the selected bits matched.

A single rule configured on the switch chip typically consists of:
1. a list of source ports (at least one);
2. a mask string indicating any bits of interest in the key;
3. a value string indicating the values the bits of interest must have; and
4. a (possibly empty) list of destination ports to which matching packets should be sent.

Each rule has one value string and one mask string. Where identifying the complete set of traffic of interest needs more than one value/mask pair, multiple rules may need to be added to the list.

Two important edge cases are noted: it is possible to pass all traffic between certain source and destination ports, by setting all of the mask bits for a rule to 0; and it is possible to drop some or all traffic arriving at a certain source port such that it is not sent anywhere, by adding a rule that will match that traffic but has an empty list of destination ports.

When a packet arrives, the switch chip typically follows the following procedure:
1. Determine the corresponding key for the packet.
2. Consider each rule in its list, in order, until it finds a rule that both matches the source port for the packet and specifies a value/mask pair that matches the key for the packet.
3. Send a copy of the packet to all destination port(s) indicated by the rule, if any.
4. Stop considering further rules.

Figure 4:
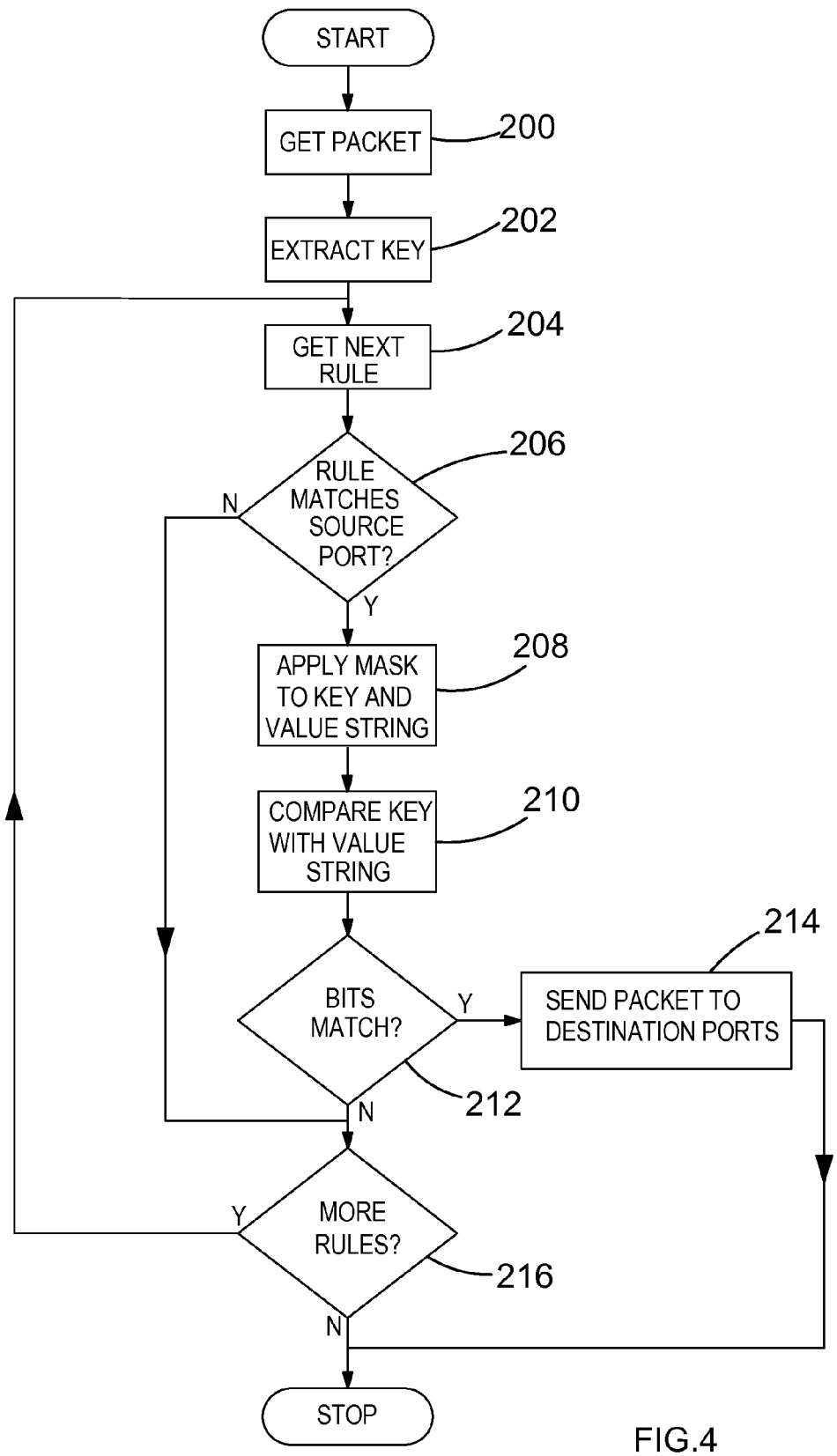
FIG. 4 is a flow diagram of a process typically carried out by a switch chip for each packet.

FIG. 4 is a flow diagram of the process typically carried out by the switch chip for each packet.

Referring to FIG. 4, in step 200 a data packet is received by the switch chip. In step 202 the key is extracted from the packet. In step 204 the switch chip gets the next rule from the TCAM. In step 206 the switch chip determines whether the source port on which the packet was received matches a source port in the rule. If the packet's source port does not match a source port in the rule, then processing passes to step 216, where it is determined whether there are any more rules.

If the packet's source port does match a source port in the rule, then in step 208 the mask string is applied to the key and to the value string. In step 210 the key is compared to the value string. In step 212 it is determined whether the (un-masked) bits in the key match the (un-masked) bits in the value string. If the bits do not match, then processing passes to step 216, where it is determined whether there are any more rules. If the bits do match, then in step 214 the packet is sent to the destination port or ports specified in the rule, and the process then stops.

In step 216 it is determined whether there are any more rules. If there are no more rules, the process stops, and the switch chip moves on to processing the next packet. If there are more rules, processing returns to step 204 and the next rule is considered.

Although FIG. 4 shows a sequence of steps, in practice the switch chip may consider all rules simultaneously, prioritising the rules according to their order in the rule list.

Configuring the Network Packet Broker

Conventional network packet brokers require the user to specify the list of rules that will be implemented, in the desired priority order, with little more assistance than letting them specify value/mask pairs for header fields separately and having the user interface combine them into the single string to match against a key. However such an approach has several weakness, including the following:

1. It has limited expressive power. A system administrator responsible for configuring a packet broker might be interested in all traffic on a set of VLANs (for example, 100, 110 and 120) or a range of TCP ports (for example all ports in the range 15,000-20,000). However, such specifications cannot in general be represented by a single value/mask pair. Thus the user must manually determine a set of rules using value/mask pairs that collectively identify the traffic of interest. This requires a non-trivial understanding of the underlying functionality.

2. It does not allow for interactions between rules. For example, a user may want to copy all traffic destined for a certain part of their network to one tool and to copy all traffic using a certain network protocol to a second tool. If they set up two corresponding rules to implement this configuration, then traffic that meets both criteria will only be directed by the switch chip according to whichever rule comes first in the priority order, and will therefore reach only one of the two tools that the operator intended.

3. It may lead to inefficient rule lists. It is possible for various redundancies to be introduced in the rule list. For example, if no traffic will ever get as far as a later rule in the list because earlier rules would already have made a decision for all relevant packets, then the later rule is redundant. However, as lists grow to hundreds or thousands of rules, it becomes prohibitively difficult for a human operator to detect and remove such inefficiencies manually. Given that switch chips typically have limited capacity for rules, and the number of rules required to implement practical configurations may be large, using a more efficient representation for the desired configuration can be the difference between being able to implement that configuration within the available hardware capacity or not.

Multiple Stage Strategies

A possible way to improve on the conventional model described above is to implement a multiple stage strategy. In this case the hardware may support more complicated decision-making processes than the basic case described above. For example, the available hardware might support multiple-stage decision making, where a packet is analysed several times using a similar technique to that described above.

Instead of immediately determining the final set of destination ports for that packet, each stage would make a partial decision that influences the overall behaviour, such as immediately dropping packets that meet certain conditions or designating some possible destination ports for traffic that continues to the next stage. The decision about which destination ports (if any) should receive a copy of the packet is then made by combining the effects of each stage. An example of this strategy is providing a preliminary pass that can drop certain types of traffic arriving at a given source port, known as ingress filtering. Similarly, a final pass may be added just before traffic leaves a given destination port that will drop packets meeting some condition, known as egress filtering. Typically these stages would bracket a middle stage that makes the main decision about the destination port(s) where a packet should be sent (as long as a packet got that far without being dropped by ingress filtering, and is not subsequently dropped by egress filtering before it leaves).

An example of a network monitoring system implementing a multi-stage strategy is disclosed in US 2012/0106354. The system includes packet forwarding circuitry which forwards packets between input ports and output ports based on rules set up in ingress filter engines and egress filter engines. A network tool optimizer is provided that can receive user defined filters specifying how the user wishes to direct traffic from the input ports to the output ports. A "filter" in this context defines the input and output ports between which packets are to be forwarded, as well as any filtering which is carried out on those packets. Overlapping filters are handled using a technique referred to as action superset egress (ASE) processing. This uses two TCAM filtering stages and implements filter rules using a combination of ingress filter engines and egress filter engines to handle overlapping filters. Ingress filter rule criteria contain source port information and have actions identifying destination ports. The ASE processing forwards ingress filter matches to all egress ports that are directly connected to the user-defined filter and to the egress ports connected to overlapping filters. Egress filter rule criteria contain information identifying one or more source port(s) and one or more destination port(s). The ASE processing uses egress filter engines to pass only those packets actually desired at the destination tool. This packet superset forwarding ensures that packets matching higher priority TCAM filter rules are still delivered to the egress filter rules associated with lower priority overlapping TCAM filter rules.

Thus the system disclosed in US 2012/0106354 requires two filtering stages. At the first stage the system directs each packet to a superset of the egress ports where it is required. At the second stage the identification of both source and destination ports of interest for the filtering is required.

An advantage of this kind of multi-stage strategy, particularly where some of the filtering behaviour can be applied only at selected network ports, is that it helps to implement filtering requirements that overlap. For example, suppose the user wishes to monitor traffic destined for a certain part of their network, using two different tools, with each tool considering the traffic for a different protocol. This could be implemented by having the main decision making stage detect the traffic for the right part of the network by filtering on the relevant address fields and forwarding that traffic to the destination ports for both tools, but then having separate egress filtering on each destination port that drops all traffic that isn't using the protocol of interest for that tool.

However multiple pass strategies may suffer from the following weaknesses of their own:

They may require additional hardware functionality.

In the absence of additional hardware functionality they may not offer a completely general solution for overlapping filters. Although some practically useful scenarios can be implemented this way, usually there are only one or two additional passes available. Given sufficiently complicated filtering requirements, the same weaknesses as the traditional approach will eventually reappear.

Filtering behaviour in a packet broker should preferably take place before any bottlenecks in the traffic path. For example, given an aggregation of two ingress links from the live network running at 1 Gbps, there is potentially 2 Gbps of incoming data in the combined stream. If that data is to be filtered and sent on to a tool on the monitoring network over another 1 Gbps link, it is important that filters are applied first to cut the traffic down to a rate that will fit, or data may be lost unnecessarily. If a multiple pass strategy is implemented using hardware that has any traffic paths with limited bandwidth before the final filtering decisions are made, unnecessary bottlenecks may be introduced, causing the packet broker to drop traffic unnecessarily.

Range-Based Tools

In most cases it is not possible to represent a contiguous range of values, such as 10-20, with a single value/mask pair and thus to add a single entry in a switch chip's rule list that will identify traffic meeting that criterion and make a decision about where to forward the packet accordingly. However, such a range may be algorithmically converted into a set of value/mask pairs that collectively represent the same range of values. A series of rules can then be configured on a switch chip, each using one of those value/mask pairs, to achieve the desired result. Simple range-based tools are available in user interfaces for existing products of this type. This can provide more user-friendly modelling of single filtering requirements, such as capturing traffic with a range of destination TCP ports. This therefore helps to improve the expressive power of the traditional approach, albeit in a limited way.

Certain models of switch chip provide dedicated hardware support for range-based filtering in some specific contexts. Therefore it would also be possible to simply expose that hardware functionality rather than using an algorithm to convert as described above. This would have the advantage of being more space efficient, if a single rule in the rule list can represent the required behaviour when the range capability is available. However this is typically limited to a small subset of the packet headers on which filtering is available.

Automatic Rule Generation

Embodiments of the present disclosure take advantage of the existence of a general purpose CPU as well as a switch chip within the packet broker to overcome the weaknesses of the above approaches to configuring the network packet broker. Instead of exposing the internal workings of the switch chip, such as rule lists and value/mask filters, directly to users, a more intuitive configuration model can be offered, with software running on the CPU then converting between that model and the necessary internal forms to configure the switch chip and any other relevant hardware components.

Figure 5:
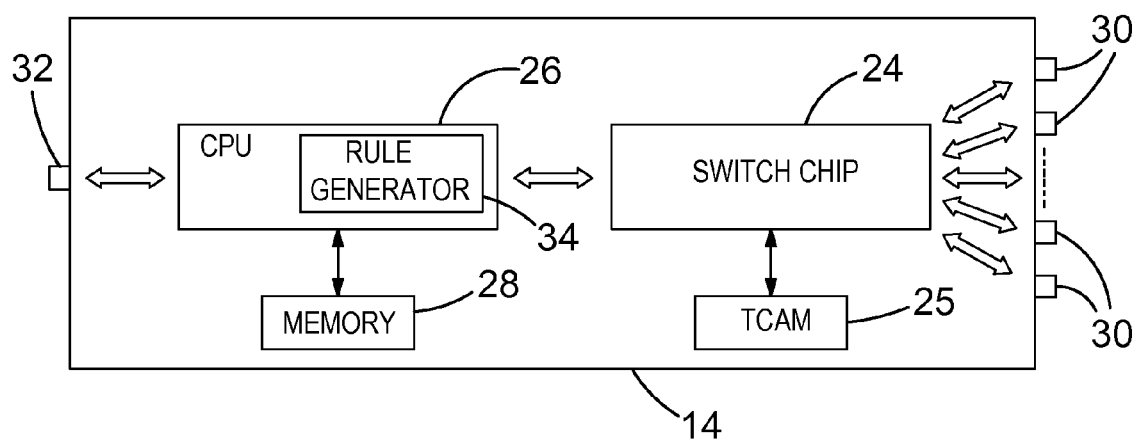
FIG. 5 shows an overview of a network packet broker in embodiment of the present disclosure.

FIG. 5 shows an overview of a network packet broker in embodiment of the present disclosure. In the arrangement of FIG. 5, a configuration model input by a user interface on a management network is received by CPU 26 via management port 32.

The configuration model is passed to rule generator 34, which in this embodiment is a software module running on the CPU 26. The rule generator 34 converts the configuration model input by the user interface to the necessary internal forms to configure the switch chip 24 and any other relevant hardware components.

Although in this embodiment the rule generator 34 is run on general purpose CPU 26, if desired a separate processor could be provided for the rule generator, or the rule generator could be implemented using dedicated circuitry.

Once rules are no longer exposed directly but instead generated from some higher-level specification, there is scope for automatically dealing with the other weaknesses identified earlier, such as automatically handling overlapping forwarding and filtering requirements and redundancies within a rule list, and all within a single switch chip so no unnecessary bottlenecks are introduced.

In embodiments of the present disclosure, issues such as overlapping packet forwarding and filtering requirements and redundancies are dealt with in advance using algorithms within the rule generator. This can allow the rule generator to generate a set of rules which can be implemented by the switch chip in a single pass. Thus, rather than relying on multiple hardware stages to resolve overlapping packet forwarding and filtering requirements, the embodiments disclosed herein can allow these issues to be dealt with in advance by producing a single list of rules for programming the switch chip which implements the user-defined packet forwarding and filtering requirements.

The Configuration Model: Filters and Maps

Embodiments of the present disclosure use a novel design that seeks to overcome the limitations described above, by providing the user with a configuration model that is independent of implementation details such as rules and ordering on the switch chip. In this configuration model, users specify how traffic should be directed by creating "filters" and "maps".

A filter is a description of network traffic of interest. An interesting packet is said to pass the filter. Filters specify whether a packet is interesting based only on the data within that packet, without reference to other factors such as the source port where a packet arrives.

More specifically, in embodiments of the present disclosure, filters are defined by specifying acceptable values for various fields, typically within the layer 2-4 headers of a packet of network traffic. A packet will pass the filter if, for each and every header field, the actual value in the packet is among the values the filter accepts.

Acceptable values may be specified in various ways. For example, for an integer field such as a VLAN header, the user might specify a single value (e.g. 10), a contiguous range of values (e.g. 10-20), a direct value/mask pair (e.g. 0/1 would represent values with their least significant bit set to 0, i.e., even numbers), or some combination of these where any item in the list matches (e.g. 100-110, 120, 130-140).

A map specifies how arriving traffic should be directed. The map connects one or more source ports to one or more destination ports, and indicates that a copy of traffic arriving at any of its source ports should be forwarded to each of its destination ports.

A map may additionally specify a set of required filters and/or a set of excluded filters to restrict which traffic it forwards. In this case, an arriving packet will be forwarded only if it passes all of the required filters and it does not pass any of the excluded filters.

Maps are considered independently, so if any map is defined that would forward an incoming packet from a given source port to a given destination port, the packet must be forwarded, even if there are other maps between those ports that would not forward that packet because of their applied filters. However, a packet arriving at a source port is forwarded to a particular destination port only once if multiple maps exist that would each do so.

With this scheme, traffic can be directed between ports based on arbitrary Boolean combinations of the available filtering effects. Thus:

excluding a filter F on a map is equivalent to requiring (NOT F);

requiring filters $F_1$ and $F_2$ on the same map is equivalent to requiring ($F_1$ AND $F_2$); and creating two maps between the same ports, one requiring $F_1$ and the other requiring $F_2$, is equivalent to requiring ($F_1$ OR $F_2$).

The user interfaces operate on the above configuration model. Configurations may be depicted and manipulated in various ways, including without limitation the use of textual ("command line") user interfaces, graphical user interfaces, and generic network management protocols such as SNMP (Simple Network Management Protocol).

Figure 9:
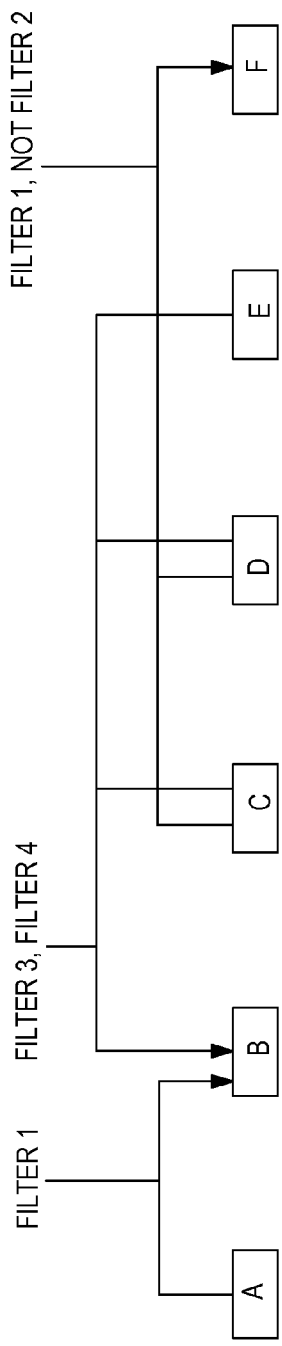
FIG. 9 shows an example user interface that may be used to input a configuration model.

As an example, a configuration may be graphically depicted in a user interface as shown in FIG. 9. In FIG. 9, the boxes labelled A-F represent network ports, and the lines with arrows from source to destination ports represent maps. Multiple source or destination ports may be connected to such lines to represent more complex maps such as aggregations and replications. Lines may be annotated to show any required or excluded filters applied to the map, for example by labelling them "Filter 1" if Filter 1 is required or "NOT Filter 2" if Filter 2 is excluded.

The user interface of FIG. 9 can allow a map to specify a plurality of filters, including required filters and excluded filters. Each filter is identified by a unique ID, and maps specify their filters using those filter IDs. The filter ID is an abstract identifier either provided by the user or generated internally by the rule generator or user interface.

This presentation may enable the user to see an overview of their entire configuration on a single screen. It may also allow convenient mechanisms for adjusting the maps in the configuration, such as drawing a path from one port to another using a mouse or finger to add a new map between those ports. It may also allow convenient mechanisms for adjusting which filters are applied to maps, for example by displaying all defined filters when the user clicks on the arrow representing a map with a mouse and allowing the user to mark whether each filter is required, excluded or neither for that map.

The filters themselves may be defined in a separate part of the user interface. For example, a second screen might be available that prompts the user for the name of a filter and the values for each supported header field that the filter should accept. To assist the user when many header fields are supported but some combinations would not be meaningful in practice, the user interface may display only header fields that make sense in the context of the aspects of the filter that the user has already specified. The user interface may also offer on-line help regarding the formats available to the user for specifying acceptable values (such as those shown in the table below under the heading "Formats for fields taking integer values") and may provide immediate feedback to the user if they attempt to provide an invalid specification.

Such a graphical user interface may be helpful in allowing the user to configure non-trivial filters in a guided way to help reduce complexity and prevent certain kinds of user error. It may also be helpful in allowing the user to configure maps and their required and excluded filters quickly using familiar and intuitive techniques such as "dragging" with a mouse, and in particular to do so without concern for whether any of the maps and filters they are configuring will interact. It may therefore be possible to specify a realistic configuration significantly faster and admitting fewer possibilities for user error using such a user interface than it would have been to specify an equivalent configuration using a conventional user interface where the user was required to work more directly with an ordered list of rules and to manage any interactions between those rules manually. However, if desired, the present disclosure may be used with any other type of user interface, such as a command line type user interface.

A separate software process known as the rule generator runs on the CPU to translate this configuration into a suitable list of rules to program the switch chip. The rule generator bridges the gap between the configuration model exposed to the outside world and the internal implementation details of the switch chip.

Specification of Behaviour

Formally, the behaviour of the system follows the following mathematical model.

Ports

Let $\mathcal{P}$ be the set of network ports in the device.

Filters

Let $\mathcal{H}$ be the set of header fields that may be used to identify packets of interest for filtering purposes.

Let $\mathcal{F}$ be the set of defined filters.

Each filter $F \in \mathcal{F}$ is a vector $F=[\mathcal{V}_h]$ whose elements are the set of acceptable values for each field $h \in \mathcal{H}$.

By convention, only fields of interest are specified explicitly, and $\mathcal{V}_h$ is otherwise assumed to be the set of all possible values for its field h.

Given an incoming packet of traffic, let $t=[t_h]$ be the corresponding actual values in the packet header.

A packet with headers t will then pass a filter F, denoted $t \sim F$, if and only if $t_h \in \mathcal{V}_h$ for all h. Similarly, we write $t \not\sim F$ if the packet does not pass the filter.

Maps

Let $\mathcal{M}$ be the set of defined maps.

Each map $M \in \mathcal{M}$ is a tuple $M=(S, \mathcal{F}^+, \mathcal{F}^-, \mathcal{D})$ where:

$S \subseteq \mathcal{P}$ is the non-empty set of source ports, $\mathcal{F}^+ \subseteq \mathcal{F}$ is the possibly empty set of required filters, $\mathcal{F}^- \subseteq \mathcal{F}$ is the possibly empty set of excluded filters, and $\mathcal{D} \subseteq \mathcal{P}$ is the non-empty set of destination ports for the map.

Required System Behaviour

Given an ingress packet with headers t arriving at a source port $s \in \mathcal{P}$, a single copy of that packet must be forwarded to destination port $d \in \mathcal{P}$ if and only if there exists a map $M \in \mathcal{M}$ where $s \in S$, $d \in \mathcal{D}$, $t \sim F^+ \forall F^+ \in \mathcal{F}^+$, and $t \not\sim F^- \forall F^- \in \mathcal{F}^-$.

Accepted Values for Filters

When defining a filter, the set of acceptable values $\mathcal{V}_h$ for header h can be specified in various formats depending on the type of header field, as described in the following sections.

Formats for Fields Taking Integer Values

| Description | Format | Example | Acceptance condition |
|---|---|---|---|
| Single value | n | 10 | $t_h = n$ |
| Range of values | l-u | 10-20 | $l \leq t_h \leq u$ |
| Value/mask pair | v/m | 1/0 | $(t_h \underline{v} v) \wedge m = 0$ |
| Combination | List of formats as above | 1, 3, 5, 7-10 | Any individual list entry accepts |

Thus ranges are inclusive at both ends, a value/mask pair tests whether the masked bits in the packet header are equal to the corresponding bits of the given value while ignoring any bits not set in the mask, and a combination accepts whenever at least one of its component elements would accept.

Formats for Fields Taking Structured Values

Certain packet headers of interest contain more structured values such as IPv4 addresses, IPv6 addresses or MAC addresses.

For example, an IPv4 address consists of four integers in the range 0-255, conventionally written in "dotted quad" notation such as 192.168.0.1.

In these cases, the formats available for integer-valued fields may be generalised by considering each part of the structured value separately and conventional syntax may be supported.

For example, a filter using a field such as the layer 3 header "Destination IPv4 address" might specify the set of acceptable values for that field as 192.168.*.*. This is shorthand for 192.168.0-255.0-255, which in turn means the first two components accept only the fixed values 192 and 168 respectively and each of the last two components accept a range 0-255, interpreted as above.

System Architecture

The aim of the rule generator is to take the maps and filters in the configuration model specified by the user at the user interface, and convert them into rules which can be processed by the switch chip in the way described above with reference to FIG. 4, in such a way that packets will always be correctly routed in accordance with the maps and filters specified by the user.

Figure 6:
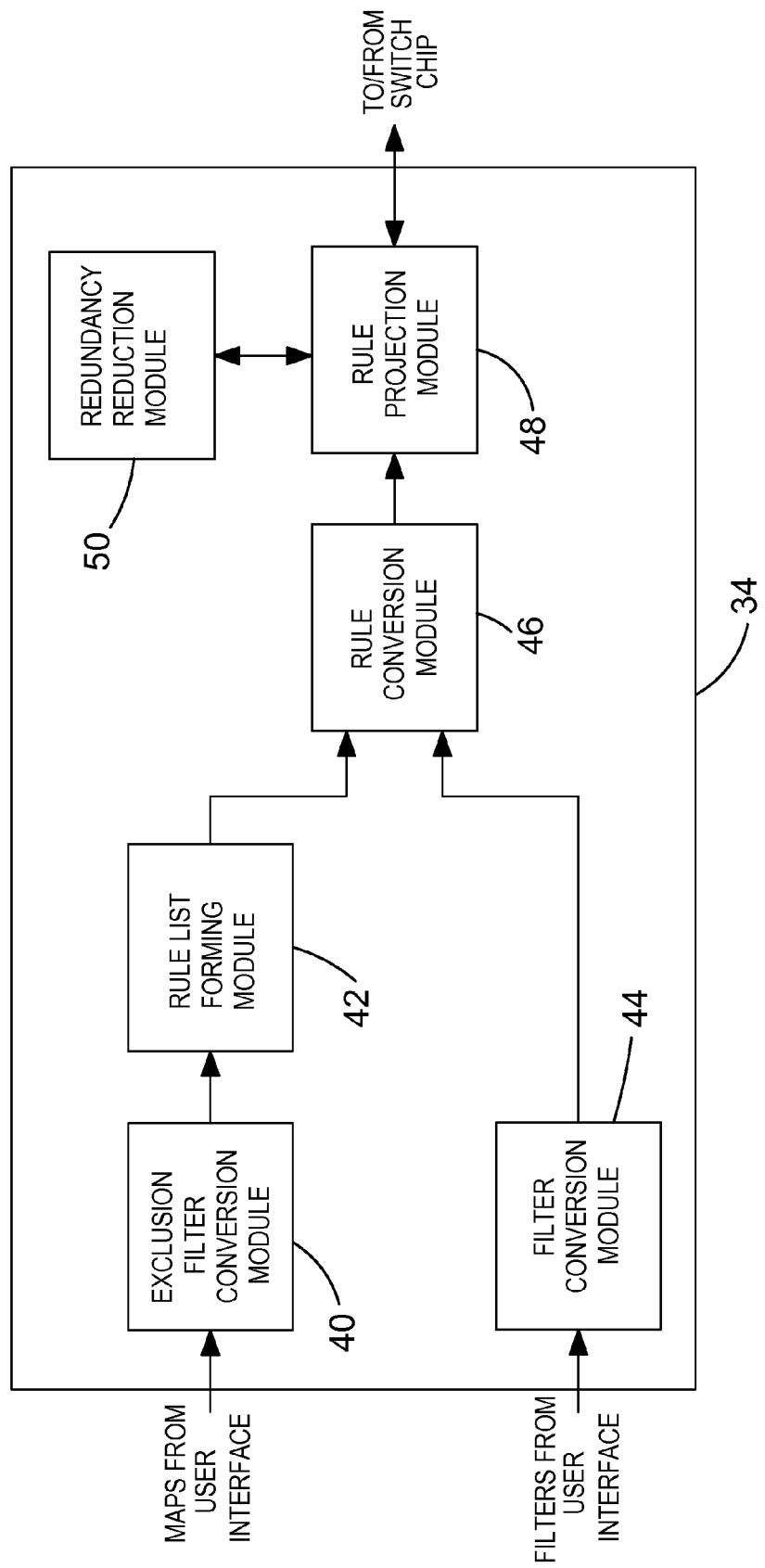
FIG. 6 shows the overall design of a rule generator in an embodiment of the disclosure.

FIG. 6 shows the overall design of the rule generator 34. The system illustrated in FIG. 6 contains a number of different modules, each of which performs a specific task. This allows data coming into the system from user interfaces to be systematically transformed into a list of rules that follow the required conventions for programming the switch chip and in a suitable order.

Referring to FIG. 6, the rule generator comprises exclusion filter conversion module 40, rule list forming module 42, filter conversion module 44, rule conversion module 46, rule projection module 48, and redundancy reduction module 50.

Maps from the user interface are first input to the exclusion filter conversion module 40. The exclusion filter conversion module 40 is provided to enable the rule generator to handle maps with exclusion filters. The exclusion filter conversion module adds some extra maps, known as "drop maps", into the set of maps received from the user interface. These systematically adjust the behaviour of the core algorithm that comes next so that by the time the rule list comes out at the end of the core algorithm, the exclusion effects have been properly incorporated and everything is represented only in terms of required filters. Thus the output of the exclusion filter conversion module 40 is the original maps with drop maps added.

The original maps with added drop maps are fed to rule list forming module 42. Rule list forming module 42 contains the core algorithm that allows the unordered maps from the user interface (with any added drop maps) to be converted into an ordered list of rules for configuring the switch chip. However at this stage the rule list continues to use the filters in the form in which they are defined by the user. Thus the output of the rule list forming module 42 is an ordered rule list using user filters.

Filters from the user interface are input to the filter conversion module 44. The filter conversion module 44 converts the user defined filters into a bitwise form for configuring the switch chip. Thus the output of the filter conversion module 44 is the filters in bitwise form. The output of the filter conversion module 44 is fed to the rule conversion module 46, together with the ordered rule list from the rule list forming module 42.

The rule conversion module 46 converts the rules in the ordered rule list to an ordered rule list using bitwise filters. The ordered rule list using bitwise filters is fed to the rule projection module 48, which converts each rule in the list into the format required to program the switch chip.

Finally, a redundancy reduction process is performed by the redundancy reduction module 50, to remove unnecessary rules.

The function of each of the modules in FIG. 6 is described in detail below.

Exclusion Filter Conversion Module

In the present embodiment, the configuration model input by a user allows maps to be specified with exclusion filters. The required behaviour in this case is that traffic must not be forwarded by that map if any of those filters applies.

In general, such conditions cannot be implemented directly by a rule in the switch chip, because rules match positively based on whether an ingress packet's key matches a given value/mask. However, the same result may be achieved by taking advantage of the first-match-only nature of the decision-making on switch chips.

Specifically, given a requirement to forward traffic between certain ports but only if the traffic does not satisfy some condition, two rules may be placed in the list. One rule is added that forwards all traffic between the chosen ports, without any filtering. A second rule is then added, earlier in the list so it pre-empts the more general rule, that selects traffic satisfying the undesired condition and directs this to an empty set of destination ports instead; this is known as a drop rule. Because unwanted traffic will be intercepted at the drop rule and will not therefore be considered by any later rules in the list, any traffic that reaches the later general rule is already known not to satisfy the undesired condition and can safely be forwarded to the chosen destination ports.

The rule generator uses a generalised version of this technique to implement exclusions. The configuration is initially specified by the user in terms of maps and filters, and there may be multiple required and/or excluded filters applied to any given map. Later stages in the rule generator deal with issues such as interactions between filters and generating appropriate value/mask pairs. However the system first requires a pre-processing stage to extend the user's given set of maps, which may have both positive and negative filtering requirements, with additional drop maps that serve as the high-level equivalent to drop rules. This pre-processing stage is carried out by the exclusion filter conversion module 40.

The exclusion filter conversion module 40 identifies any maps with exclusion filters, and, where they occur, adds a new map known as a drop map into the set of maps specified by the user. A drop map selects traffic satisfying the undesired condition and directs it to an empty set of destination ports. Thus, unlike the user-specified maps, the drop maps have no destination ports. The drop maps systematically adjust the behaviour of the core algorithm that comes next so that by the time the rule list comes out at the end of the core algorithm, the exclusion effects have been properly incorporated and everything is represented only in terms of required filters.

Formally, the input to this stage is the set of user-specific maps, $\mathcal{M}$, and the output is an extended set of maps with drop maps added to allow for exclusions, $\mathcal{M}_D$, computed according to the following algorithm.

---

$\mathcal{M}_D \leftarrow \emptyset$

For each $M = (S, \mathcal{F}^*, \mathcal{F}^-, \mathcal{D}) \in \mathcal{M}$:

$\mathcal{M}_D \leftarrow \mathcal{M}_D \cup \{M\}$     Always add input maps to the output.

For each $F^- \in \mathcal{F}^-$:     If there are any exclusion filters, then for each one . . .

Let $M_D = (S, \mathcal{F}^+ \cup \{F^-\}, \emptyset, \emptyset)$     . . . also add a drop map that requires that filter along with $\mathcal{M}_D \leftarrow \mathcal{M}_D \cup \{M_D\}$     all the original required filters, for the same source ports.

---

If no exclusion filters are specified for any map, this algorithm simply returns the same set as output that it received as input.

Rule List Forming Module

The rule list forming module 42 contains the core algorithm which enables an ordered rule list to be produced. This module takes an unordered set of maps, with possibilities for both required and excluded filters and for overlapping filter effects, and produces an ordered list of rules in which all filtering requirements are represented positively and additional rules may have been inserted to cope with exclusion filters and interactions between maps.

Formally, we are transforming the input set of maps, $\mathcal{M}_D$, into an ordered list of rules, $R = [R_1, \ldots, R_n]$, where each rule has a similar structure to maps but with no exclusion filters, $R_k = (S_k, \mathcal{F}_k^+, \mathcal{D}_k)$.

Before this algorithm is explained in detail, one additional concept is defined: a map $M_A$ "dominates" another map $M_B$ if $M_A$ defines destination ports for all of the traffic that $M_B$ does. Formally, given $$M_A = (S_A, \mathcal{F}_A^+, \mathcal{F}_A^-, \mathcal{D}_A),$$

$$M_B = (S_B, \mathcal{F}_B^+, \mathcal{F}_B^-, \mathcal{D}_B)$$

we say $M_A$ dominates $M_B$ and write $M_A \supseteq M_B$ if and only if $$S_A \supseteq S_B,$$

$$\mathcal{F}_A^+ \subseteq \mathcal{F}_B^+, \text{ and}$$

$$\mathcal{F}_A^- \subseteq \mathcal{F}_B^-.$$

This concept can be extend to comparing maps with rules, by treating rules as having an empty set of exclusions.

In order to systematically construct a rule list that will implement the required behaviour, an algorithm is established for incrementally modifying an existing rule list R to add the effect of a map M, such that if we worked down the output rule list in order and considered only the destination ports specified in the first matching rule:

1. all traffic would still be directed to all destination ports as in the original rule list, and
2. any traffic arriving at a source port and matching the filtering criteria specified by M would additionally be directed to all destination ports specified by M.

Figure 7:
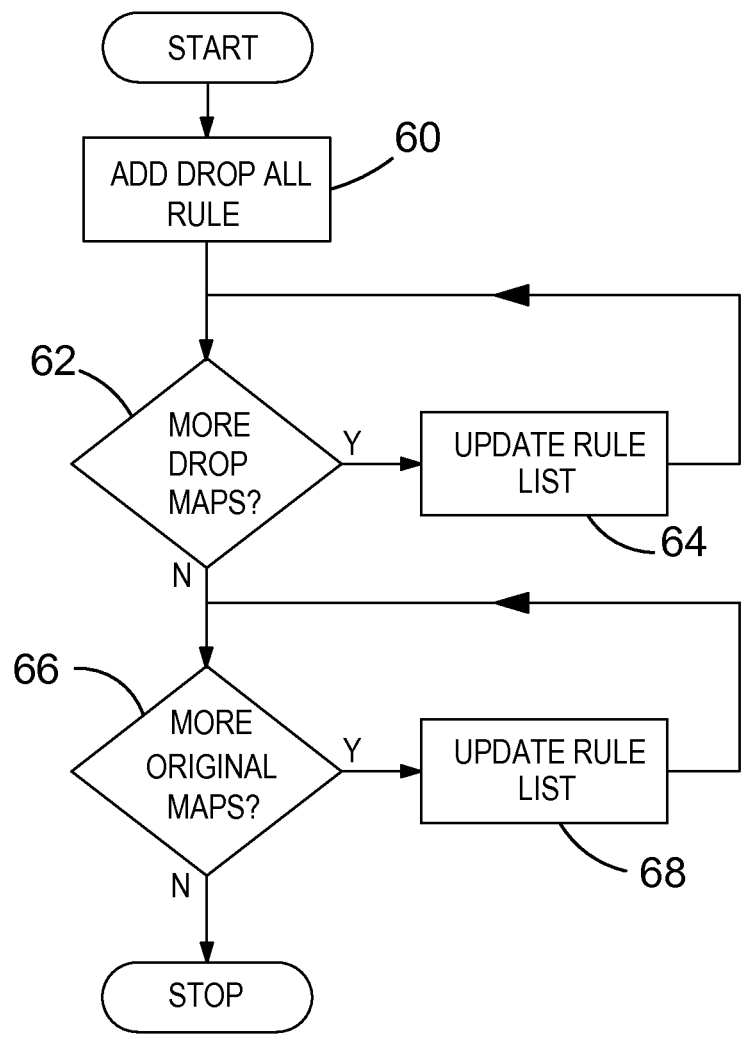
FIG. 7 shows an overview of a core algorithm performed by a rule list forming module.

FIG. 7 shows an overview of the core algorithm performed by the rule list forming module 42. Referring to FIG. 7, in step 60 the list of rules R is started with a drop-all rule of the form (S, 0, 0, 0). The drop-all rule ensures that the default behaviour if no other maps affect a given ingress packet is explicitly not to forward that packet to any destination port. Otherwise, for example, a switch chip might forward the packet to all network ports by default.

In step 62 the algorithm checks to see if there are any (more) drops maps which were generated during pre-processing in the exclusion filter conversion module 40. If there are any drops maps, then in step 64 the rule list is updated with the drop map. This is done using an "update rule list" algorithm explained below.

In step 66 the algorithm checks to see if there are any (more) original maps (i.e. maps which were originally received from the user interface). If there are any original maps, then in step 68 the rule list is updated with the map. This is also done using the "update rule list" algorithm explained below. If there are no more maps then the algorithm ends.

By following the order shown in FIG. 7, since maps have knowledge of their excluded filters, each original map will safely pass any corresponding drop maps without updating their sets of destination ports to include its own. It is important not to add any original maps that use exclusion filters into R before adding in the corresponding drop maps, because once the intended effects are represented by rules rather than a map, the explicit knowledge of which excluded filters applied is "forgotten" and the "update rule list" algorithm would treat the original map as dominating its drop maps and add the unintended destination ports back in.

Figure 8:
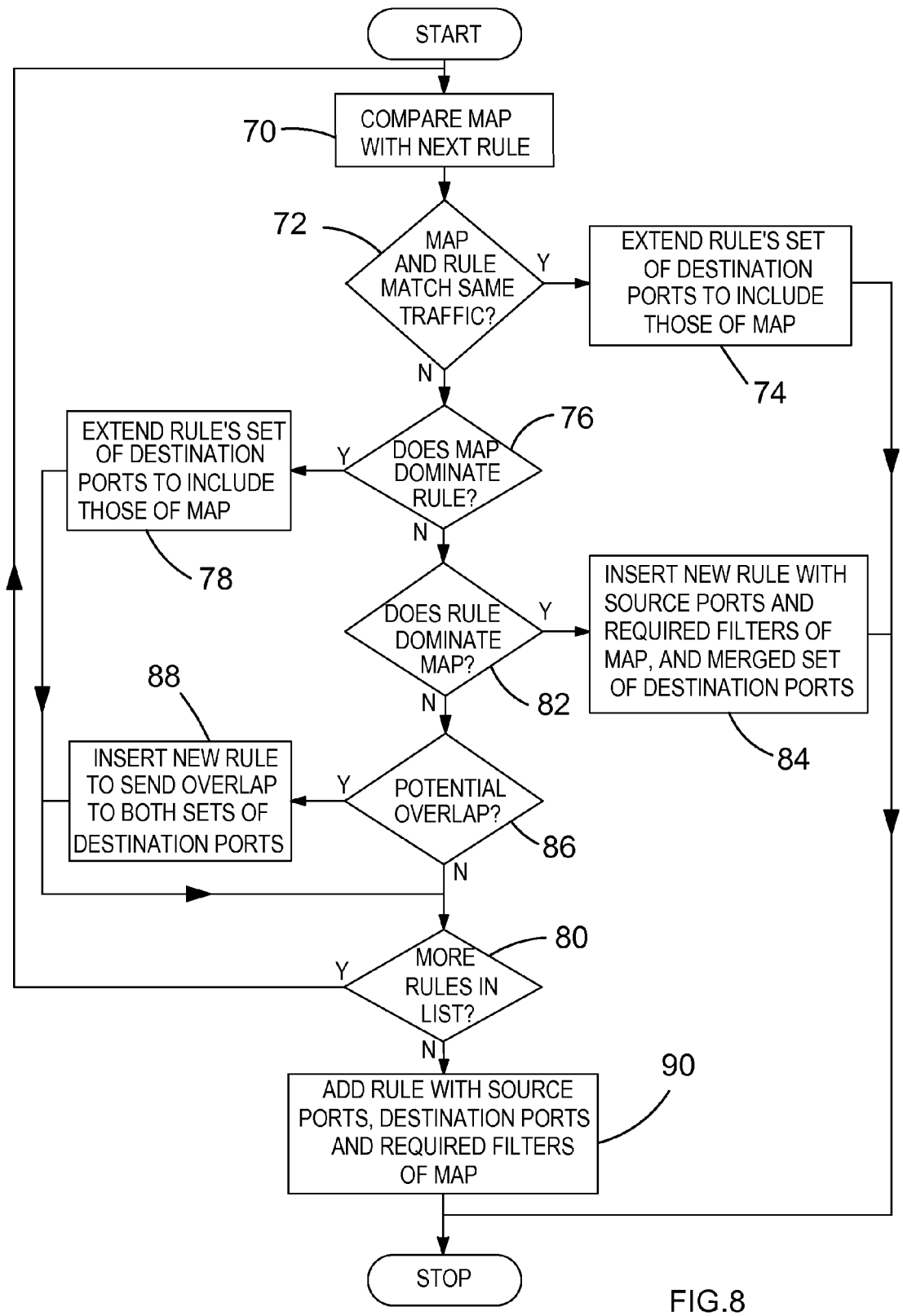
FIG. 8 shows the steps taken in an "update rule list" algorithm.

FIG. 8 shows the steps taken in the "update rule list" algorithm. In the algorithm of FIG. 8, each map is compared to successive rules in the current list of rules, and the list of rules is updated accordingly. Note that in the case of the first map (where there are no rules in the list), a rule with the source ports, destination ports and required filters of the map is added to the list (step 90).

Referring to FIG. 8, in step 70 the map is compared to the next rule in the current list of rules. In step 72 it is determined whether the map and the rule match exactly the same traffic (i.e. the source ports and the required filters of the map and the rule are the same, and the map has no exclusion filters). If the map and rule do match the same traffic, then in step 74 the rule's set of destination ports is extended to include the destination ports of the map. In this case the rule list has been updated to include the effects of the map, and the algorithm ends.

If the map and rule do not match the same traffic, then in step 76 it is determined whether the map dominates the rule. The map dominates the rule if it passes all of the same traffic as the rule (i.e. the map has all of the source ports of the rule, the rule has all of the required filters of the map, and the map has no exclusion filters). If the map dominates the rule, then in step 78 the set of destination ports in the rule is extended to include the destination ports of the map. This ensures that the rule forwards to the correct destination ports the traffic that is common to the map and the rule. The algorithm then passes to step 80 to determine whether there are any more rules in the list.

If the map does not dominate the rule, then in step 82 it is determined whether the rule dominates the map. The rule dominates the map if it passes all of the same traffic as the map (i.e. the rule has all of the source ports of the map, and the map requires all of the filters of the rule). If the rule dominates the map, then in step 84 a new rule is inserted immediately before the existing rule, with the source ports and the required filters of the map, and the destination ports of the map and the rule. This ensures that the new rule forwards to the correct destination ports the traffic that is common to the rule and the map. In this case the rule list has been updated to include the effects of the map, and the algorithm ends.

If the rule does not dominate the map, then in step 86 it is determined whether there is a potential overlap between the map and the rule. Since in this embodiment the core algorithm is working with the named filters provided by the user interface, rather than with bitwise filters (see FIG. 6), it is not possible at this stage to check whether there is actually an overlap between the filters. Therefore at this stage it is determined that there is a potential overlap if the map and rule share any common source port, and one does not require a filter which is excluded by the other. If there is determined to be a potential overlap, then in step 88 a new rule is inserted immediately before the existing rule, the new rule sending the possibly overlapping traffic to both sets of destination ports. The algorithm then passes to step 80 to determine whether there are any more rules in the list.

In an alternative embodiment, rather than assuming that there is a potential overlap if the map and rule share any common source port, and one does not require a filter which is excluded by the other, it would be possible for the algorithm to inspect the filter definitions and make a more informed decision about whether there is potential overlap. This may avoid the algorithm adding overlap rules that will predictably become redundant later.

In step 80 it is determined whether there are any more rules in the list. If there are more rules, then the algorithm returns to step 70, and the map is compared to the next rule in the list. If there are no more rules in the list, then in step 90 a new rule is added at the end of the list of rules, the new rule containing the source ports, destination ports and required filters of the map. The rule list has then been updated to include the effects of the map, and the algorithm ends.

By following the algorithm shown in FIG. 8, it can be ensured that, in the final list of rules, the more specific rules (i.e. rules with more specific filters for the same source ports) occur earlier than less specific rules. This ensures that when the user's maps/filters overlap in which traffic they would catch, the rules to handle the overlapping cases appear ahead of the individual cases from which they were derived and duly send traffic to all of the required destination ports as specified by the user.

Pseudocode showing one possible implementation of the "update rule list" algorithm is shown in Annex A. In Annex A, unsuffixed sets of ports or filters refer to those of map M, while sets suffixed k refer to those of rule $R_k$.

The "update rule list" algorithm presented above produces an ordered list of rules with the correct filtering requirements. However the algorithm admits various kinds of redundancy in the generated rule list, which may lead to problems of efficiency. A possible variation might therefore include additional manipulation of the rule list after each map has been added in. This may be analogous to the processes performed by the redundancy reduction module 50 as described below.

While the algorithm described above relates to a currently preferred embodiment, it is noted that the fundamental structure of the core algorithm is more widely applicable. For example, the core algorithm remains effective in simpler cases where exclusion filters are not used or if no optimisations are used. In other words, the use of exclusion filters and optimisations can be considered as refinements of the basic principles.

Furthermore, the core algorithm described above builds a rule list in terms of generic named filters, without making any assumptions about what kinds of traffic pass each filter at this stage. Separate stages described in the following sections then deal with converting from the user's specification of traffic that should pass each filter into value/mask pairs used by the switch chip. However, a monolithic version of the core algorithm that works directly with filters expressed as value/mask pairs is also possible. This could be derived from the algorithm as presented above by adjusting the definition of dominance and how additional rules are inserted in the potential overlap case in the algorithm.

Filter Conversion Module

Referring back to FIG. 6, the filter conversion module 44 converts each individual named filter $F \Sigma \mathcal{F}$, where the set of acceptable values for one or more packet headers is specified by the user, into a bitwise form based on value/mask pairs. This is essentially a two-stage operation.

Firstly, because the set of acceptable values for a given header field, $\mathcal{V}_h$, cannot in general be represented by a single value/mask pair, a set of value/mask pairs that collectively represent exactly the acceptable set $\mathcal{V}_h$ is derived for each header h. If any ranges of acceptable values are specified, these will be converted into an efficient set of value/mask pairs. If a list of multiple specifications is given, some effort is made to combine them efficiently and reduce the number of value/mask pairs needed to represent the overall combination.

Secondly, once each individual header has been broken down into a set of value/mask pairs, the input filter F is rewritten as a product of these sets. That is, for each input filter F, we determine a set F' of header-to-value/mask mappings (in the mathematical sense of "mapping"), where each mapping specifies a single value/mask pair for each header field, and collectively the mappings in F' identify exactly the same traffic as the input filter F.

The output of this stage in the rule generator is then the set $\mathcal{F}'$ of all bitwise filters F', where each $F' \in \mathcal{F}'$ is a direct replacement for the corresponding $F \in \mathcal{F}$ but now expressed in a bitwise, value/mask form.

Rule Conversion Module

Referring again to FIG. 6, the output of the rule list forming module 42 is an order rule list containing the user defined filters. To make use of the bitwise filters produced by filter conversion module 44, the rule conversion module 46 converts the rule list R generated by the rule list forming module 42 into a corresponding list of bitwise rules R'.

Each rule $R \in R$ will in general be replaced by a list of corresponding rules in R' rather than a single entry. That list may be empty.

The goal is that each bitwise rule $R' \in R'$ will share the same source and destination ports as its parent rule from R, but instead of specifying a set of user-defined filters from $\mathcal{F}$, it will now have its filter specified as a single value/mask pair for each header field h. Thus we move closer to the form ultimately required to configure the switch chip.

To do this, note that for each rule $R \in R$, we have in general a set of multiple filters $F \in \mathcal{F}^+$ applied, and for each of those in turn we have a corresponding bitwise filter $F' \in \mathcal{F}'$ that may give multiple header-to-value/mask mappings. We consider all possible combinations for each header field, drawing one value/mask pair from each bitwise filter and attempting to reconcile them.

For each consistent combination of filtering effects, i.e., where the result is a valid single value/mask pair for each header field, we generate a corresponding bitwise rule in the output list. In general, many combinations may result, so a single rule in the input list may yield many bitwise rules in the output. These rules must be kept together in the output list and preserve the ordering of their parent rules.

If a combination of filtering effects is self-contradictory, i.e., if for any header field the combination of value/mask pairs from multiple filters is incompatible and no packet could ever satisfy them all simultaneously, then that combination is discarded and no bitwise rule will be created for it. For example, if the user created a map and set it to require two filters, each specifying a different TCP destination port, then that map could never pass any traffic because no packet could be destined for both TCP ports at once. Such conflicts would be detected at this stage in the rule generator, as it would be impossible to reconcile two value/mask pairs that indicated the different port numbers, so no bitwise rules would be generated for that map.

Rule Projection Module

Once the list of bitwise rules is available, it is then necessary to convert a single value/mask pair for each header field into one large value/mask pair used to program the switch chip. This may involve placing the bits from the value and mask for each header field at a corresponding offset into the output value and mask, or it may require rearrangement of the bits, depending on the format of the keys used by the switch chip.

Redundancy Reduction Module

Both the original generation of the rule list by the rule list forming module 42, and the subsequent switch from working with generic named filters to value/mask forms in the rule conversion module 46, can leave redundant rules in the lists they produce. The redundancy reduction module 50 performs some post-processing of the list to identify and remove various forms of redundancy.

The redundancy removal algorithms described below are optimisations: they take a list of rules as input and generate a modified list of rules as output that is shorter but still specifies the same behaviour.

As shown in FIG. 6, the primary use of these techniques is at the end of the process, once all other transformations have been completed, as this is when the most information about rules is available. In practice, analogous techniques may also be employed immediately after each map is inserted into the rule list during the core algorithm, as a performance optimisation.

Two specific types of redundancy are considered.

Firstly, a rule may be backward redundant. In this case, one or more earlier rules in the list collectively handle all traffic that would be processed by a later rule, so any packets that get as far down the list as that later rule will never satisfy it. The later rule is then redundant and can safely be removed.

A simple example of backward redundancy would be that if we have two rules that each select traffic meeting certain filter criteria from a different source port, a third rule that appears later in the list, uses the same filter criteria, and accepts traffic from both source ports would be redundant. Any packet arriving at either port that passes those filters would already have been directed by one or other of the earlier rules.

Note that backward redundancy is determined by the source ports and filters for the rules; the destination ports are irrelevant.

Another possibility is forward redundancy. In this case, an earlier rule that determines the destination ports for a certain combination of source ports and filters may be made redundant by a later rule that dominates the first and makes the same decision about destination ports, as long as no rule exists in between that also selects any of the same traffic but makes a different decision about destination ports.

A simple example of forward redundancy would be having an earlier rule that directs traffic from a given source port to a given destination port if it satisfies certain filtering requirements, and then having a later rule that forwards all traffic from the same source to the same destination without any filtering applied. The later rule dominates the first and makes the same decision about where to send the traffic, so unless anything in between those rules can affect the same traffic, the first rule is redundant and can safely be removed.

Advantages

The embodiments of the disclosure described above may provide the advantage that, once the rules have been programmed into the switch chip's TCAM, the system is able to send each packet to the destination ports where it is required and no others using a single stage. This is in contrast to the prior art multiple stage techniques, which require at least two stages and the identification of both source and destination ports of interest for the filtering at the second stage.

Thus the present embodiments may avoid the need for additional hardware functionality, and reduce bottlenecks, leading to greater efficiency.

It will be appreciated that the rule generator described above can be run without actually having to program the switch chip. For example, general control software running on the CPU may use the rule generator to generate any list of rules in the required format, and then control software may be used to communicate with physical components. This means, for example, that the rule generator can be run to see what the result would be without necessarily implementing that result for real, which is advantageous if for example the list of rules produced would be too big to fit in the available memory and the user's requested configuration cannot be implemented.

Distributed Network Packet Broker

In the embodiment described above with reference to FIG. 5, a CPU embedded in the network packet broker runs all of the control software. Thus in this embodiment the CPU provides the main control functions including user interface support, rule generation, and sending control signals to the switch chip via internal physical connections within the device. This arrangement is referred to herein as a unified network packet broker.

In an alternative embodiment, the user interface and the rule generator software run on a second CPU within a separate controller device, while the ingress/egress network ports and the switch chip remain on a switch device similar to the network packet broker described above. This arrangement is referred to herein as a distributed network packet broker.

Figure 10:
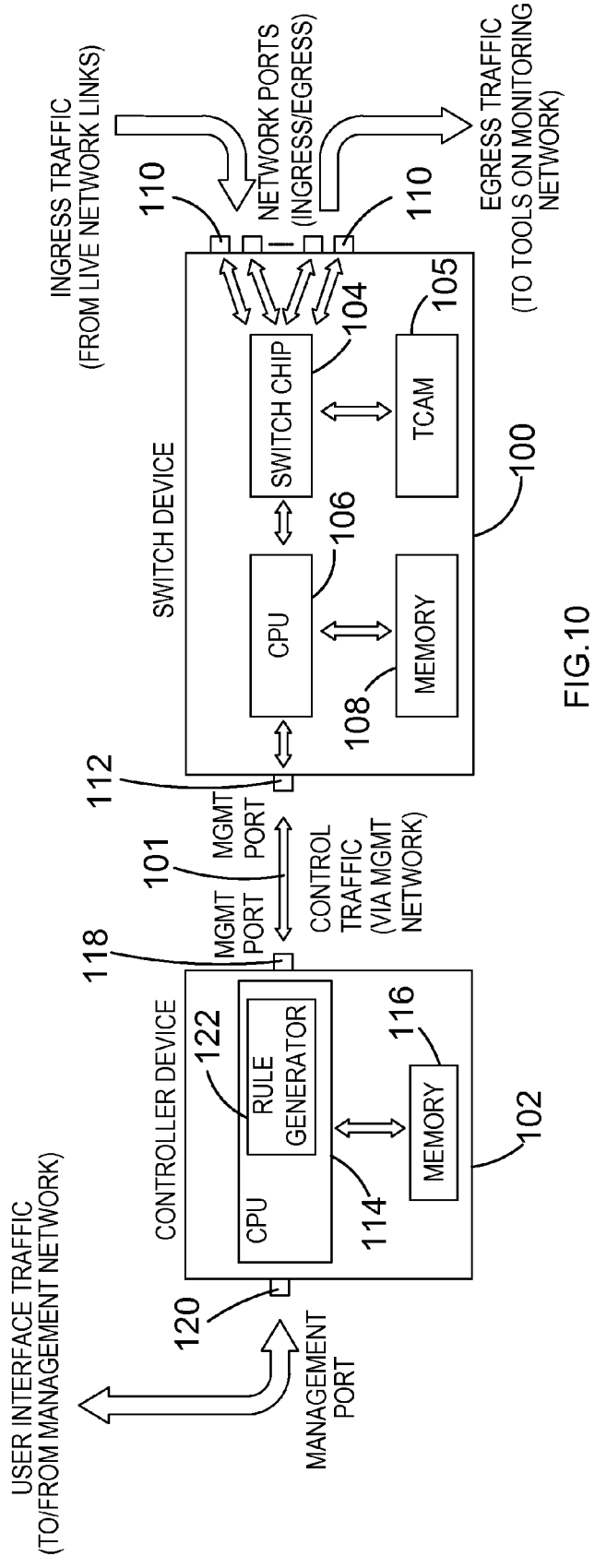
FIG. 10 shows a distributed network packet broker.

FIG. 10 shows one possible arrangement of hardware and signalling in a distributed network packet broker. Referring to FIG. 10, the distributed network packet broker comprises a switch device 100 connected via a network link 101 to a controller device 102. The switch device 100 comprises switch chip 104, TCAM 105, CPU 106, memory 108, network ports 110 and management port 112, which are similar to the corresponding parts described above with reference to FIGS. 2 and 5. The controller device 102 comprises CPU 114, memory 116, and two management ports 118, 120. A rule generator 122 runs on the CPU within the controller device.

In operation, the controller device 102 receives a configuration model input by a user interface via management port 120. The configuration model is passed to rule generator 122, which in this embodiment is a software module running on the CPU 114. The rule generator 122 converts the configuration model input by the user interface to configuration data used to program the switch chip 104, in a similar way to that described above with reference to FIGS. 5 to 8. The configuration data are then sent over the network link 101 to the switch device 100.

At the switch device 100 the configuration data are received by the management port 112 and passed to the CPU 106. The CPU 106 runs software which is used to program the switch chip 104 using the configuration data received from the controller device 102.

It will be appreciated that alternative arrangements are possible, for example using a single management port on the controller device to transmit and receive both user interface traffic and control traffic.

Aside from the additional controller hardware itself, the distributed network packet broker in this embodiment also requires:

a physical network link between the controller device and the switch device;

a suitable protocol to represent rules and any other required configuration data during transmission over that physical link;

suitable encoder software on the controller device to take configuration data that would be sent directly to the hardware in a unified packet broker, and instead transmit that data over the network link to the switch device; and suitable decoder software on the switch device to receive such configuration data from the network link, extract the relevant details, and configure the switch chip and any other hardware components accordingly as in a unified packet broker.

Physically separating the controller device and the switch device may afford, amongst others, the following potential advantages:

The CPU and memory used to run the user interface and rule generator software may have higher specifications than in a unified packet broker.

Off-the-shelf hardware may be used as the switch device.

A single controller device may be used with multiple switch devices.

The CPU and memory included in a switch device typically have relatively low specifications. This may provide advantages such as reduced energy consumption and lower manufacturing costs. However, the user interface and rule generation algorithms used in a network packet broker may be computationally expensive when working with demanding configurations. A dedicated controller device may allow the use of upgraded hardware, such as a more powerful CPU or additional RAM, enabling the system to respond more quickly to commands from user interfaces and support more demanding configurations.

It is now possible for customers to buy bare metal network switches from a number of suppliers, which are physically similar to the hardware device sold by network packet broker vendors but come with minimal software as standard so the customer can install their own choice of firmware. In particular, devices and firmware are now available supporting a standard protocol known as OpenFlow. OpenFlow is a communications protocol that gives access to the data plane of a network switch. This can allow the transmission of configuration data analogous to the rules produced by the rule generator of the present disclosure. Thus in one embodiment the user interface and rule generation functionality runs on a dedicated controller appliance or even on a regular PC connected to the network and serving as the controller device, and a protocol such as OpenFlow is used to communicate with a bare metal switch with suitable software installed to act as the switch device. Of course it will be understood that protocols other than OpenFlow may be used instead.

The ability to use more powerful CPU and greater amounts of RAM in a stand-alone controller device may also allow greater scability for the system as a whole.

Multiple Switch Chips

In a network packet broker as described above, a single switch chip is used to pass traffic from the live network to the monitoring network. Such an arrangement may be referred to as a single-switch network packet broker. In such an arrangement, the number of ingress/egress network ports on the device as a whole is limited by the number of physical connections available on that switch chip.

In an alternative embodiment, a multiple-switch network packet broker is provided which can support a greater number of ingress/egress network ports. This can be achieved by:
1. incorporating multiple switch chips;
2. allocating some of the physical connections on each switch chip to transfer network traffic to or from other switch chips within the system, and connecting these via internal wiring within the device;
3. allocating some or all of the remaining physical connections on each switch chip to ingress/egress network ports, as in a single-switch packet broker;
4. connecting the CPU running the management software to each switch chip, allowing them all to be controlled from the same CPU; and
5. implementing a generalised version of the rule generator software on that CPU, as described below.

Figure 11:
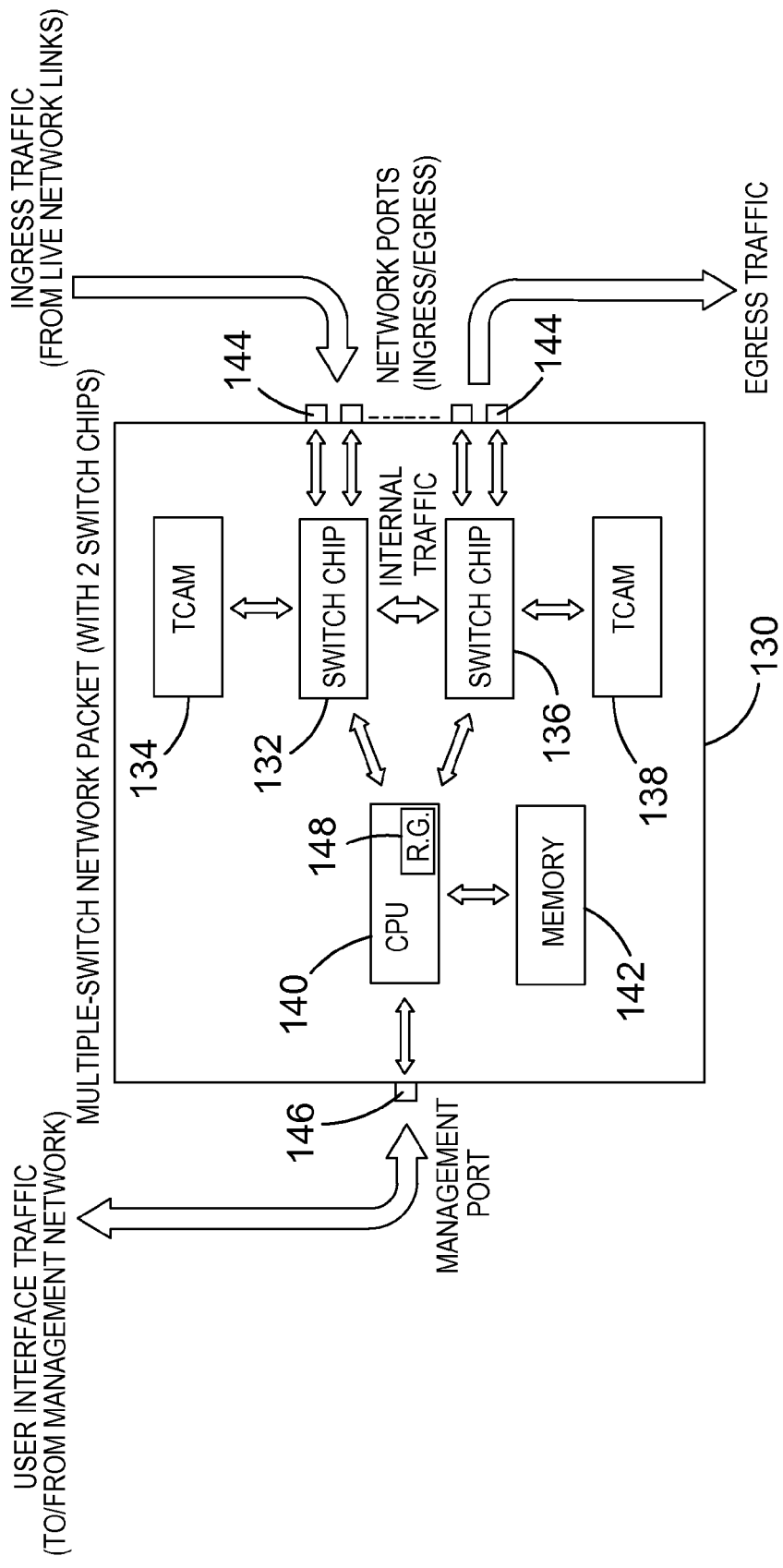
FIG. 11 shows a multiple-switch packet broker with two switch chips.

One possible arrangement of hardware and signalling in a multiple-switch packet broker with two switch chips is shown in FIG. 11. Referring to FIG. 11, the multiple-switch network packet broker 130 comprises first switch chip 132, first TCAM 134, second switch chip 136, second TCAM 138, CPU 140, memory 142, network ports 144 and management port 146, all of which are similar to the corresponding parts described above in the previous embodiments. A rule generator 148 runs on the CPU 140.

In FIG. 11 two switch chips are shown by way of example only, and greater numbers of switch chips might also be used, provided that sufficient internal links are present between them to satisfy the conditions described below. In general, any switch chips within such a system might receive ingress traffic from ports connected to the live network and/or transmit egress traffic to tools on the monitoring network; no inference should be drawn from the display of one switch chip above the other in this particular diagram.

The rule generator as previously described may be adapted to support this multiple chip arrangement as follows:
1. Divide each user-supplied map into a set of maps with the same collective effect but each having only source ports connected to the same switch chip.
2. Run the rule generator once for each switch chip, in each case taking into account only the maps with source ports on that chip.
3. Configure each switch chip so that rules from the generator output that forward traffic to any of the chip's own ports do so directly, while traffic destined for ports connected to other switch chips is forwarded to internal ports that are connected directly or indirectly to those chips.
4. Configure each switch chip so that incoming packets received from an internal port connected to another switch chip (rather than a network ingress port) are forwarded to their correct destination port(s).

This relies on two assumptions not previously made:
1. A continuous path exists from each source port to each destination port used in any map. That is, either they are both physically connected to the same switch chip, or their switch chips are themselves physically connected using internal links either directly or via one or more further connected switch chips.
2. A signalling mechanism is available such that a packet of network traffic arriving at a source port on one switch chip and ultimately destined for a port on a different switch chip may be forwarded from one chip to the other with sufficient extra information that it can be sent to the correct destination port(s) when it arrives.

One possible implementation of the latter idea would forward a packet from one switch chip to the next with an additional header added to carry the destination data. On arrival, the receiving switch chip would check the header for directions and then remove it to leave only the original packet data again.

Such behaviour may be supported directly by some models of switch chip. Alternatively, it could be implemented by using more general functionality to add a standard header such as a VLAN tag on the transmitting switch chip, adding extra rules to the list on the receiving switch chip that direct traffic based on the information in that VLAN tag, and configuring the receiving switch chip to strip the tag before forwarding the packet. Such rules would not interfere with any others prepared by the rule generator, as they would apply only to ingress ports connected to other switch chips rather than the live network and would therefore necessarily be independent of rules generated from any user-supplied maps between ingress and egress network ports.

For example, suppose that we are given a user-supplied map:

$$s_1, s_2 \text{-} f \rightarrow d_1, d_2$$

where this denotes source ports $s_1$ and $s_2$, a required filter f, and destination ports $d_1$ and $d_2$.

Suppose also that ports $s_1$ and $d_1$ are located on one switch chip, while $s_2$ and $d_2$ are located on a second connected switch chip, and an (internal) port $x_1$ on the switch containing port $s_1$ is connected across to an (internal) port $x_2$ on the switch containing port $s_2$.

In this case, the system would first split the map into two components based on the source ports' switch chips:

$$s_1 \text{-} f \rightarrow d_1, d_2$$

$$s_2 \text{-} f \rightarrow d_1, d_2$$

This set of maps would in turn be adjusted to include forwarding between switch chips where necessary. The chips would also be configured to add a suitable header to carry the destination information across chips before forwarding, and to filter on and then remove that header on the other side:

$s_1$-f→$d_1$,$x_1$ (with header indicating $d_2$ added to $x_1$ traffic)

$x_1$-(header indicating $d_1$)→$d_1$ (with header removed)

$s_2$-f→$d_2$,$x_2$ (with header indicting $d_1$ added to $x_2$ traffic)

$x_2$-(header indicating $d_2$)→$d_2$ (with header removed)

The rule generator algorithms would then be used as normal to convert these maps into one ordered list of rules for each switch chip, in this case taking the first two maps as the inputs for rule generation on the first switch chip and the remaining two maps as the inputs for the generation on the second chip.

Multiple Switch Devices

It will be appreciated that the arrangements described above may be combined in various ways. For example, it would be possible to create a distributed network packet broker where a single controller device managed multiple switch devices, using the same techniques as described above but repurposing some of the external network ingress/egress ports on each switch device to connect to other switch devices and thus create paths to forward network traffic between the switch chips on different switch devices.

Figure 12:
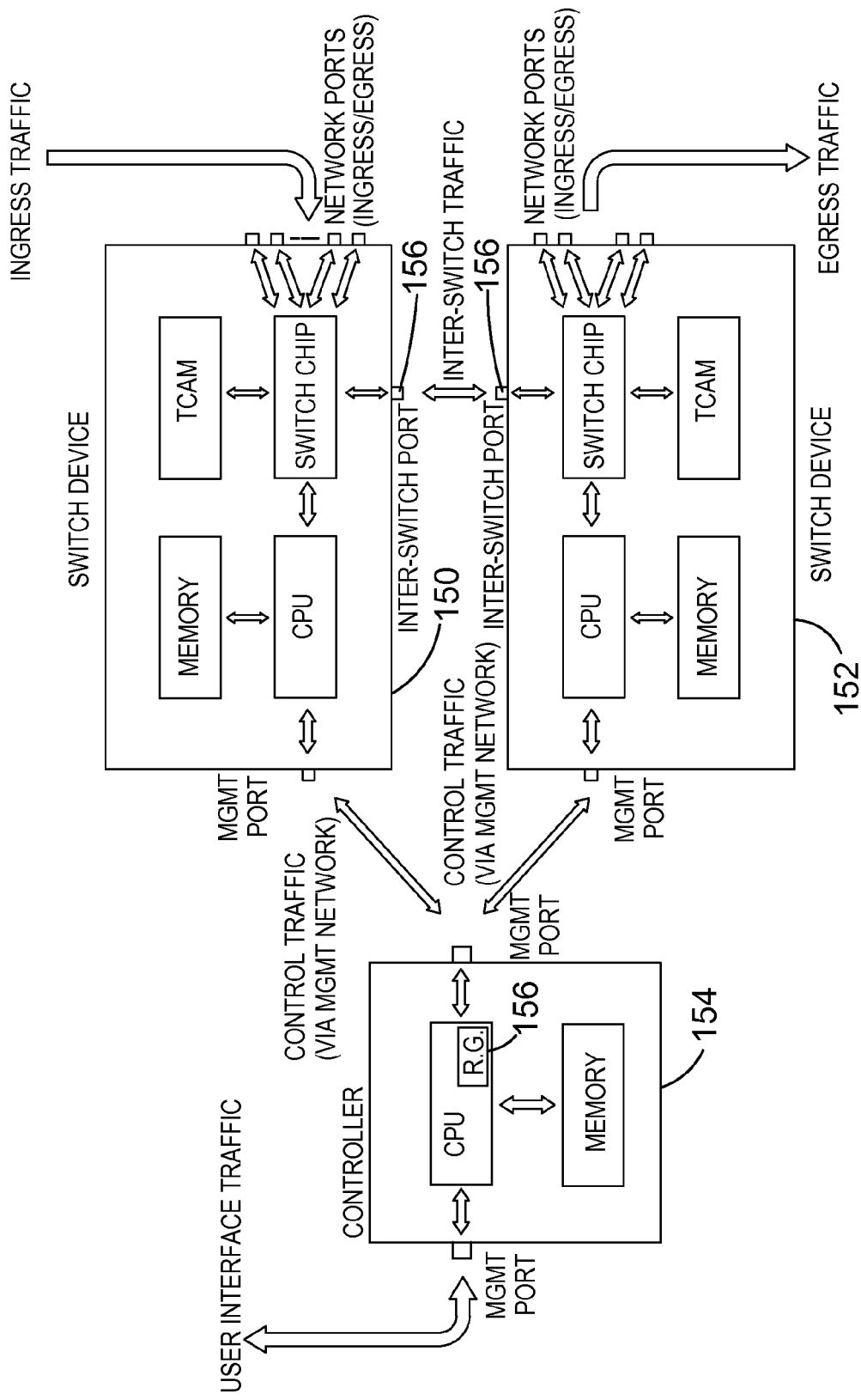
FIG. 12 shows a distributed network packet broker with multiple switch chips.

One possible practical application is illustrated in FIG. 12. This shows a distributed network packet broker with multiple switch chips, here within multiple switch devices. In this arrangement, two switch devices are used to create a packet broker that can offer more network ingress/egress ports than a single switch device, allowing for larger-scale aggregations of traffic from the live network.

Referring to FIG. 12, a first switch device 150 and a second switch device 152 are connected via a management network to a controller device 154. Each of the switch devices 150, 152 comprises a switch chip, a TCAM, a CPU and memory as well as network ports and a management port, which are similar to the corresponding parts described above in the previous embodiments. In addition, each switch device 150, 152 includes an inter-switch port 156 which carries inter-switch traffic.

The controller device 154 comprises a CPU, memory, and management ports in a similar way to that described above with reference to FIG. 10. A rule generator 158 runs on the CPU within the controller device 154. The rule generator 158 converts the configuration model input by the user interface to configuration data used to program the switch devices 150, 152. The configuration data are sent over the management network to the switch devices 150, 152.

More than two switch devices could be used for still greater port counts, as could multiple switch chips within the same switch device. In practice for ease of administration the network ports taking ingress traffic from the live network might be located on different switch devices than the network ports sending egress traffic onward to the tools on the monitoring network, but this is not an inherent limitation in the present disclosure.

In this case, some or all of these switch devices might be bare metal network switches controlled via a protocol such as OpenFlow. It would also be possible to create a packet broker with multiple switch devices but no separate controller. In this case, the CPU of one of the switch devices could run user interface and rule generator software as in a unified network packet broker, but also configure the other switch devices by communicating with software running on their CPUs as a separate controller device would.

Given sufficient hardware functionality, there may be multiple inter-switch ports on each switch device. The links between them may then be arranged as a "trunked" connection that acts as a single high capacity link rather than a set of individual links.

Figure 13:
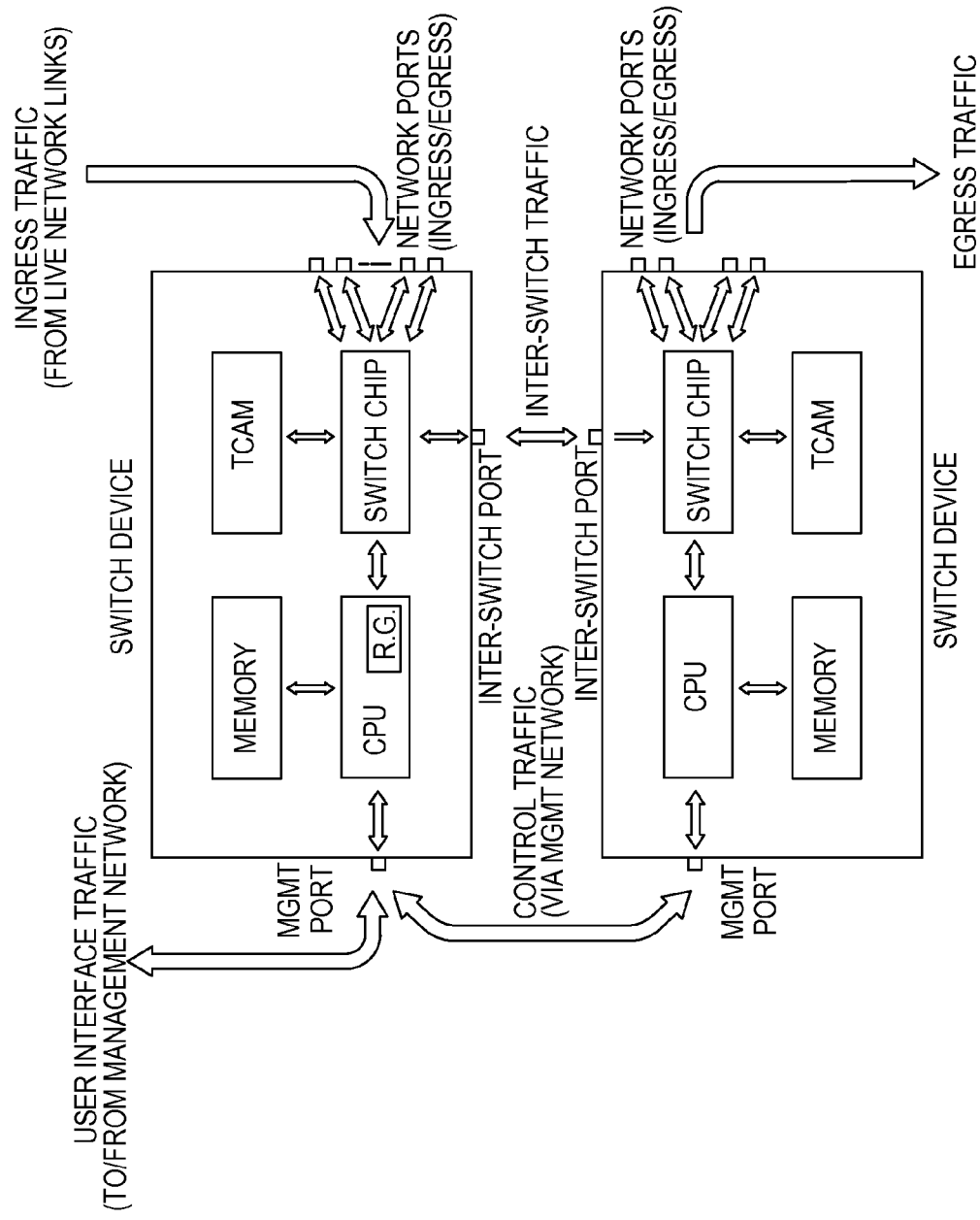
FIG. 13 shows a network packet broker with multiple switch chips within multiple switch devices and integrated control.

FIG. 13 shows an example of a network packet broker with multiple switch chips within multiple switch devices and integrated control. In this example, two switch devices are shown, each containing a single switch chip and one of those switch devices also hosting the control functionality.

It will be appreciated that various embodiments have been described above by way of example only, and various modifications will be apparent to the skilled person within the scope of the appended claims.

Annex A

Procedure add_map_into_rule_list(R, M):
  k ← 1
  While k < |R|:
    If M ⊱ $R_k$ and $R_k$ ⊱ M:    M exactly matches source ports and filters of existing rule $R_k$...
      $R_k$ ← ($S_k$, $\mathcal{F}_k^+$, $\mathcal{D}_k \cup \mathcal{D}$)    ...so just add any extra destination ports from M to the existing rule.
      Stop    All traffic for M is now dealt with.
    Otherwise, if M ⊱ $R_k$:    If M dominates $R_k$...
      $\mathcal{D}_k$ ← $\mathcal{D}_k \cup \mathcal{D}$    ...make sure any traffic intercepted by rule $R_k$ also reaches M's destinations.
    Otherwise, if $R_k$ ⊱ M:    If $R_k$ dominates M...
      Insert new rule (S, $\mathcal{F}^+$, $\mathcal{D}_k \cup \mathcal{D}$) into R at position k
        ...insert a preemptive rule like M, but also including $R_k$'s destinations.
      Stop    All traffic for M is now dealt with.
    Otherwise, if |$S_k$ ∩ S| > 0 and |$\mathcal{F}_k^+$ ∪ $\mathcal{F}^-$| = 0:
      Unless there are contradictory filters, if $R_k$ and M share any common source ports they could potentially interact, so...
      Insert new rule ($S_k$ ∩ S, $\mathcal{F}_k^+$ ∪ $\mathcal{F}^+$, $\mathcal{D}_k \cup \mathcal{D}$) into R at positon k
        ...insert a preemptive rule to combine the destinations for the overlap.
      k ← k + 1    Continue down the list to deal with any non-overlapping effects of M.
    k ← k +1
  Append new rule (S, $\mathcal{F}^+$, $\mathcal{D}$) at the end of R
    If we reach the end of the list without dealing with all possible effects of M, add a final rule after everything else to handle any remaining part.
  Stop    All traffic for M is now dealth with.

What is claimed is:

1. A network packet broker system comprising:
a rules generator implemented by a processing unit and configured to:
execute a rules list forming module which incrementally determines a list of rules by incorporating the effect of successive maps from a configuration model comprising a set of maps and a set of filters, wherein each map specifies at least one source port and at least one destination port and each filter specifies a condition under which a packet of interest may pass the filter,
wherein additionally the rules list forming module converts the set of maps into a list of rules and the rules generator forwards the rules list; and
a network packet broker comprising:
a plurality of source ports which receive incoming data packets;
a plurality of destination ports which transmit outgoing data packets; and
a switch chip configured to perform switching and filtering of incoming data packets based upon the rules list received from the rules generator, the switch chip comprising a filter engine, wherein the switch chip implements the filtering in one pass using a single filter engine.

2. The network packet broker system according to claim 1, wherein a filter is defined without reference to a port.

3. The network packet broker system according to claim 1, wherein a filter specifies an acceptance value for a field within a packet.

4. The network packet broker system according to claim 3, wherein the rules generator is arranged to convert the filter acceptance values into value/mask pairs.

5. The network packet broker system according to claim 1, wherein a map may specify a filter.

6. The network packet broker system according to claim 5, wherein a map specifies that a packet arriving at any of its source ports and passing its specified filters should be forwarded to each of its destination ports.

7. The network packet broker system according to claim 5, wherein a map may specify a filter as either a required filter or an exclusion filter.

8. The network packet broker system according to claim 7, wherein the rules generator is arranged to convert a map specifying an exclusion filter into maps which perform the equivalent function using only required filters.

9. The network packet broker system according to claim 5, wherein a map may specify a plurality of filters.

10. The network packet broker system according to claim 9, wherein the plurality of filters may include required filters and excluded filters.

11. The network packet broker system according to claim 5, wherein each filter is identified by a unique ID, and maps specify their filters using those IDs.

12. The network packet broker system according to claim 1, wherein each map in the configuration model is defined independently of the other maps.

13. The network packet broker system according to claim 1, wherein the rules generator is arranged to convert a set of maps and a set of filters in an arbitrary order into an ordered list of rules for configuring the switch chip.

14. The network packet broker system according to claim 1, wherein the rules generator is arranged to receive a configuration model comprising a plurality of overlapping maps, and to convert the plurality of overlapping maps into a set of rules which the switch chip can implements in one pass.

15. The network packet broker system according to claim 1, wherein the rules list forming module is arranged to produce an intermediate list of rules from the configuration model.

16. The network packet broker system according to claim 15, wherein a rule in the intermediate list of rules comprises at least one source port, a list of any destination ports and any required filters.

17. The network packet broker system according to claim 15, wherein the intermediate list of rules produced by the rules list forming module identifies any filters required by rules using filter IDs.

18. The network packet broker system according to claim 17, wherein the rules generator comprises a filter conversion module arranged to convert each filter from a user-provided specification of packets of interest into an internal form where values accepted for each filter field are represented using value/mask pairs.

19. The network packet broker system according to claim 17, wherein the rules list forming module may consider all or part of the full definitions of filters for optimisation purposes.

20. The network packet broker system according to claim 17, wherein the rules generator is arranged to convert an intermediate rules list that specifies required filters by ID to another intermediate rules list that specifies required filters using a value/mask pair for each filter field.

21. The network packet broker system according to claim 15, wherein the rules list forming module is arranged to incrementally modify the intermediate list of rules to add the effect of successive maps from the configuration model.

22. The network packet broker system according to claim 21, wherein the intermediate list of rules is modified such that more specific rules occur earlier in the list than less specific rules.

23. The network packet broker system according to claim 21, wherein the intermediate list of rules is modified to add the effect of a map such that any packet which would be forwarded to a destination port by the intermediate list of rules before it was modified is still done so by the intermediate list of rules after it is modified.

24. The network packet broker system according to claim 21, wherein the intermediate list of rules is modified to add the effect of a map such that any packet arriving at a source port and matching a filter specified by the map will be directed to all destination ports specified by the map.

25. The network packet broker system according to claim 21, wherein:
the rules generator comprises an exclusion filter conversion module arranged to convert a map specifying an exclusion filter into maps which perform the equivalent function using required filters, and
the rules list forming module is arranged to insert the maps generated by the exclusion filter conversion module into the rules list such that rules to drop packets that are unwanted due to the exclusion filter preempt later rules that would otherwise pass those packets.

26. The network packet broker system according to claim 21, wherein the rules list forming module is arranged to compare each map with successive rules in the intermediate list of rules.

27. The network packet broker system according to claim 26, wherein the rules list forming module is arranged to add a new rule or to modify an existing rule in the intermediate list of rules in dependence on the result of the comparison.

28. The network packet broker system according to claim 26, wherein if a map and a rule match the same traffic, then a set of destination ports in the rule is extended to include the destination ports of the map.

29. The network packet broker system according to claim 26, wherein if a map matches all of the same traffic as a rule but not vice versa, then a set of destination ports in the rule is extended to include the destination ports of the map.

30. The network packet broker system according to claim 26, wherein if a rule passes all of the same traffic as the map but not vice versa, then a new rule is inserted in the intermediate list of rules with the source ports and the required filters of the map, and the destination ports of the map and the rule.

31. The network packet broker system according to claim 26, wherein if there is a potential overlap between a map and a rule then a new rule is inserted in the intermediate list of rules, the new rule sending the possibly overlapping traffic to both sets of destination ports.

32. The network packet broker system according to claim 15, wherein the rules generator comprises a rule conversion module arranged to convert rules in the intermediate list of rules into rules with value/mask pairs.

33. The network packet broker system according to claim 15, wherein the rules generator comprises a redundancy reduction module arranged to remove redundancy from an intermediate list of rules.

34. The network packet broker system according to claim 33, wherein the redundancy reduction module is arranged to remove a rule from the intermediate list of rules if any earlier rules in the list collectively handle all packets that would be processed by that rule.

35. The network packet broker system according to claim 33, wherein the redundancy reduction module is arranged to remove a rule from the intermediate list of rules if at least one later rule makes an earlier rule redundant.

36. The network packet broker system according to claim 15, wherein the rules generator comprises a rules projection module arranged to convert each rule in the intermediate list of rules into a format required to program the switch chip.

37. The network packet broker system according to claim 36, wherein the list of rules for programming the switch chip is stored in memory.

38. The network packet broker system according to claim 37, wherein the memory is content addressable memory.

39. The network packet broker system according to claim 37, wherein the switch chip is arranged to apply the rules based on the order in which they are stored in the memory.

40. The network packet broker system according to claim 1, wherein a rule in the list of rules comprises:
at least one source port;
a value string; and
a list of destination ports.

41. The network packet broker system according to claim 40, wherein a rule further comprises a mask string indicating bits of interest in the value string.

42. The network packet broker system according to claim 40, wherein the switch chip is arranged to compare the value string to a value obtained from a data packet arriving from the source port, and to direct the data packet to destination ports in the list of destination ports in dependence on the result of the comparison.

43. The network packet broker system according to claim 40, wherein the switch chip is arranged to generate a key from an incoming data packet, and to compare the key to the value string.

44. The network packet broker system according to claim 1, comprising a processing unit programmed to implement the rules generator.

45. The network packet broker system according to claim 44, wherein the processing unit is provided in the same device as the switch chip.

46. The network packet broker system according to claim 45, wherein the processing unit is provided in a separate device from the switch chip.

47. The network packet broker system according to claim 1, wherein the network packet broker system comprises a plurality of switch chips, and the rules generator is arranged to convert the configuration model into a set of rules for configuring each of the plurality of switch chips.

48. The network packet broker system according to claim 47, wherein the network packet broker system is arranged to transfer traffic between the switch chips.

49. A system comprising:
a rule generator implemented by a processing unit configured to:
execute a rules list forming module which receives a configuration model comprising a set of maps, wherein each map specifies at least one source port and at least one destination port and a set of filters, wherein each filter specifies a condition under which a packet of interest may pass a filter of the set of filters,
wherein additionally the rules list forming module converts the set of maps into a list of rules and the rules generator forwards the rules list; and
a network packet broker comprising:
a plurality of source ports which receive incoming data packets;
a plurality of destination ports which transmit outgoing data packets; and
a switch chip configured to perform switching and filtering of incoming data packets based upon the rules list received from the rules generator, the switch chip comprising a filtering engine, wherein the switch chip implements the filtering in one pass using a single filter engine.

50. A network packet broker system comprising:
a user interface arranged to define a configuration model, the configuration model comprising a set of maps and a set of filters, wherein each map specifies at least one source port and at least one destination port, and each filter specifies a condition under which a packet of interest may pass the filter; and
a network packet broker comprising:
a plurality of source ports which receive incoming data packets;
a plurality of destination ports which transmit outgoing data packets; and
a switch chip configured to perform switching and filtering of incoming data packets based upon a rules list received from the user interface, the switch chip comprising a filter engine, wherein the switch chip implements the filtering in one pass using a single filter engine.

51. The network packet broker system according to claim 50, wherein the user interface allows a user to specify a filter to be used with a map.

52. A method of configuring a network packet broker, the network packet broker comprising a plurality of source ports which receive incoming data packets, a plurality of destination ports which transmit outgoing data packets, and a switch chip which directs incoming data packets from a source port to a destination port based on a configurable set of rules, the method comprising:

defining a configuration model comprising a set of maps and a set of filters, wherein:

each map specifies at least one source port and at least one destination port, and each filter specifies a condition under which a packet of interest may pass the filter; and converting the configuration model into a list of rules for configuring the switch chip, wherein:

the converting the configuration model into a set of rules comprises incrementally determining the list of rules by incorporating the effect of successive maps from the configuration model, and the configuration model comprises overlapping filters and is converted into a list of rules which the switch chip implements in one pass.

\* \* \* \* \*

UNITED STATES PATENT AND TRADEMARK OFFICE
CERTIFICATE OF CORRECTION

PATENT NO. : 9,660,913 B2  
APPLICATION NO. : 14/656204  
DATED : May 23, 2017  
INVENTOR(S) : Christopher Andrew Newton Page 1 of 1

It is certified that error appears in the above-identified patent and that said Letters Patent is hereby corrected as shown below:

In the Claims

Column 32, Line 2, Claim 14, please delete the word "can"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*